(12) United States Patent
Zhuang

(10) Patent No.: US 12,704,959 B2
(45) Date of Patent: Aug. 11, 2026

(54) MEMORY CONTROLLER, OPERATING METHOD THEREOF, MEMORY SYSTEM, AND STORAGE MEDIUM

(71) Applicant: Yangtze Memory Technologies Co., Ltd., Wuhan (CN)

(72) Inventor: Zhiwei Zhuang, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 19/061,742

(22) Filed: Feb. 24, 2025

(65) Prior Publication Data

US 2026/0211552 A1 Jul. 23, 2026

(30) Foreign Application Priority Data

Jan. 22, 2025 (CN) ......................... 202510103748.2

(51) Int. Cl.
*G06F 12/00* (2006.01)
*G06F 3/06* (2006.01)

(52) U.S. Cl.
CPC .......... *G06F 3/0608* (2013.01); *G06F 3/0659* (2013.01); *G06F 3/0679* (2013.01)

(58) Field of Classification Search
CPC ..... G06F 3/0608; G06F 3/0659; G06F 3/0679
USPC .......................................................... 711/103
See application file for complete search history.

(56) References Cited

U.S. PATENT DOCUMENTS

| | | | | |
|---|---|---|---|---|
| 11,455,118 | B1 | 9/2022 | Kong et al. | |
| 11,521,701 | B2 | 12/2022 | Cheng et al. | |
| 2020/0348932 | A1 | 11/2020 | Zhang et al. | |
| 2023/0004297 | A1 | 1/2023 | Wan et al. | |
| 2023/0055737 | A1 | 2/2023 | Cheng et al. | |
| 2023/0068324 | A1* | 3/2023 | Drissi | G06F 3/0604 |
| 2023/0070503 | A1 | 3/2023 | Chen | |
| 2023/0103004 | A1 | 3/2023 | Chen | |
| 2023/0229318 | A1 | 7/2023 | He | |

FOREIGN PATENT DOCUMENTS

| | | | | |
|---|---|---|---|---|
| CA | 2011935 A1 * | 10/1990 | | H04L 49/254 |
| JP | 4018961 B2 * | 12/2007 | | |
| WO | WO-2022133656 A1 * | 6/2022 | | G06F 13/28 |

* cited by examiner

*Primary Examiner* — Mardochee Chery
(74) *Attorney, Agent, or Firm* — BAYES PLLC

(57) ABSTRACT

According to one aspect, the present disclosure provides a memory controller. The memory controller includes a first memory, an address manager, and a processor; the processor is configured to: write data of an N-th data packet in the first memory; the address manager is configured to: generate a first read address sequence according to a first write address sequence in which the data of the N-th data packet is written; the processor is configured to: update the first read address sequence into a first sequence table, read the data of the N-th data packet, and write data of an (N+1)-th data packet in the first memory; the address manager is configured to: generate a second read address sequence; and the processor is configured to: update the second read address sequence; and read the data of the (N+1)-th data packet according to the second read address sequence.

20 Claims, 14 Drawing Sheets

MEMORY CONTROLLER, OPERATING METHOD THEREOF, MEMORY SYSTEM, AND STORAGE MEDIUM

CROSS-REFERENCE TO RELATED APPLICATIONS

This application claims the benefit of priority to Chinese Application No. 202510103748.2, filed on Jan. 22, 2025, which is incorporated herein by reference in its entirety.

TECHNICAL FIELD

The present disclosure relates to the field of semiconductor technologies, including but not limited to a memory controller, an operating method thereof, a memory system, and a storage medium.

BACKGROUND

Memory devices are storage devices for storing information in modern information technology. As a typical non-volatile semiconductor memory, NAND (Not-And) type memories gradually become mainstream products in the storage market due to high storage density, controllable production cost, and suitable program-erase speed. However, as public requirements on storage devices continue to increase, memory devices and systems thereof still have significant room for improvement.

SUMMARY

According to one aspect of the present disclosure, a memory controller is provided. The memory controller may include a first memory, an address manager, and a processor. The processor may be configured to write data of an N-th data packet in the first memory. N may be a positive integer. The address manager may be configured to generate a first read address sequence according to a first write address sequence in which the data of the N-th data packet is written in the first memory. The processor may be configured to update the first read address sequence into a first sequence table. The processor may be configured to read the data of the N-th data packet written in the first memory according to the first read address sequence in the first sequence table. The processor may be configured to write data of an (N+1)-th data packet in the first memory according to a second write address sequence in a process of reading the data of the N-th data packet. The address manager may be further configured to generate a second read address sequence according to the second write address sequence. The processor may be further configured to update the second read address sequence into a second sequence table. The processor may be further configured to read the data of the (N+1)-th data packet written in the first memory according to the second read address sequence in the second sequence table.

In some implementations, an address ordering of the first write address sequence may be different from an address ordering of the first read address sequence, or an address ordering of the second write address sequence may be different from an address ordering of the second read address sequence.

In some implementations, the processor may be configured to update a plurality of addresses in the first memory and state values corresponding to the plurality of addresses into an address state table in real time. In some implementations, a state value of a corresponding address in the address state table being a first value may represent that the address is in an idle state. In some implementations, state value of a corresponding address in the address state table being a second value may represent that the address is in a non-idle state. In some implementations, the processor may be configured to write the data of the N-th data packet to an idle address in the first memory for which a state value is the first value according to the address state table. In some implementations, the processor may be configured to write the data of the (N+1)-th data packet to an idle address in the first memory for which a state value is the first value according to the address state table.

In some implementations, the address manager may include a write address manager and a read address manager. In some implementations, the write address manager may be configured to generate the first write address sequence according to the address state table. In some implementations, the write address manager may be configured to generate the second write address sequence according to the address state table. In some implementations, the read address manager may be configured to generate the first read address sequence according to the first write address sequence. In some implementations, the read address manager may be configured to generate the second read address sequence according to the second write address sequence.

In some implementations, N may be equal to 1. In some implementations, before the data of the N-th data packet is written in the first memory, the first sequence table and the second sequence table may both be in an idle state. In some implementations, while the data of the N-th data packet is being written in the first memory, the first sequence table may be in an updated state, and the second sequence table may be in the idle state. In some implementations, after the data of the N-th data packet is written in the first memory, the first sequence table may be in an output state, and the second sequence table may be in the updated state.

In some implementations, the N-th data packet may include X M-bit data. In some implementations, the (N+1)-th data packet may be Y M-bit data. In some implementations, a depth of the first memory may be P. In some implementations, a bit width of the first memory may be M. In some implementations, X, Y, M, and N all may be positive integers, and P may be greater than a larger one of X and Y.

In some implementations, a difference between P and the larger one of X and Y may be 1.

In some implementations, X may be greater than Y. In some implementations, the processor may be further configured to, in a process of reading the data of the N-th data packet, start writing data of an (N+2)-th data packet in the first memory according to a third write address sequence. In some implementations, the address manager may be further configured to generate a third read address sequence according to the third write address sequence. In some implementations, the processor may be further configured to update the third read address sequence into a third sequence table. In some implementations, the processor may be further configured to read the data of the (N+2)-th data packet written in the first memory according to the third read address sequence in the third sequence table.

In some implementations, the memory controller may include a second memory. In some implementations, the processor may be configured to store the first sequence table, the second sequence table, and the third sequence table into the second memory.

In some implementations, P may be less than twice the larger one of X and Y.

In some implementations, P may be equal to the larger one of X and Y.

In some implementations, the processor may be configured to, at a first point-in-time after writing the data of the N-th data packet in the first memory, start reading a first data of the N-th data packet written in the first memory according to the first read address sequence in the first sequence table. In some implementations, the processor may be configured to, at a second point-in-time after writing the data of the N-th data packet into the first memory, start writing the first data of the (N+1)-th data packet in the first memory according to the second write address sequence. In some implementations, a time interval between the first point-in-time and the second point-in-time may be a period used by the processor to read one data of the N-th data packet.

In some implementations, the first memory may include a static random access memory or a register.

According to another aspect of the present disclosure, a method of operating a memory controller is provided. The method may include writing data of an N-th data packet in a first memory of the memory controller. N may be a positive integer. The method may include generating a first read address sequence according to a first write address sequence in which the data of the N-th data packet is written in the first memory. The method may include updating the first read address sequence into a first sequence table and reading the data of the N-th data packet written in the first memory according to the first read address sequence in the first sequence table. The method may include writing data of an (N+1)-th data packet in the first memory according to a second write address sequence in a process of reading the data of the N-th data packet. The method may include generating a second read address sequence according to the second write address sequence. The method may include updating the second read address sequence into a second sequence table. The method may include reading the data of the (N+1)-th data packet written in the first memory according to the second read address sequence in the second sequence table.

In some implementations, an address ordering of the first write address sequence may be different from an address ordering of the first read address sequence, or an address ordering of the second write address sequence may be different from an address ordering of the second read address sequence.

In some implementations, the method may include updating a plurality of addresses in the first memory and state values corresponding to the plurality of addresses into an address state table in real time. In some implementations, a state value of a corresponding address in the address state table being a first value may represent that the address is in an idle state. In some implementations, a state value of a corresponding address in the address state table being a second value may represent that the address is in a non-idle state. In some implementations, the method may include writing the data of the N-th data packet to an idle address in the first memory for which a state value is the first value according to the address state table. In some implementations, the method may include writing the data of the (N+1)-th data packet to an idle address in the first memory for which a state value is the first value according to the address state table.

In some implementations, the method may include generating, by a write address manager of the memory controller, the first write address sequence according to the address state table. In some implementations, the method may include generating, by the write address manager of the memory controller, the second write address sequence according to the address state table. In some implementations, the method may include generating, by a read address manager of the memory controller, a first read address sequence according to the first write address sequence. In some implementations, the method may include generating, by the read address manager of the memory controller, the second read address sequence according to the second write address sequence.

In some implementations, N may be equal to 1. In some implementations, before the data of the N-th data packet is written in the first memory, the first sequence table and the second sequence table may both be in an idle state. In some implementations, while the data of the N-th data packet is being written in the first memory, the first sequence table may be in an updated state, and the second sequence table may be in the idle state. In some implementations, after the data of the N-th data packet is written in the first memory, the first sequence table may be in an output state, and the second sequence table may be in the updated state.

In some implementations, the N-th data packet may include X M-bit data. In some implementations, the (N+1)-th data packet may include Y M-bit data. In some implementations, a depth of the first memory may be P. In some implementations, a bit width of the first memory may be M. In some implementations, X, Y, M, and N may all be positive integers. In some implementations, P may be greater than a larger one of X and Y.

In some implementations, a difference between P and the larger one of X and Y may be 1.

In some implementations, X may be greater than Y. In some implementations, the method may include, in a process of reading the data of the N-th data packet, starting writing data of an (N+2)-th data packet in the first memory according to a third write address sequence. In some implementations, the method may include generating a third read address sequence according to the third write address sequence. In some implementations, the method may include updating the third read address sequence into a third sequence table. In some implementations, the method may include reading the data of the (N+2)-th data packet written in the first memory according to the third read address sequence in the third sequence table.

In some implementations, the method may include storing the first sequence table, the second sequence table, and the third sequence table into a second memory of the memory controller.

In some implementations, P may be less than twice the larger one of X and Y.

In some implementations, P may be equal to the larger one of X and Y.

In some implementations, the method may include, at a first point-in-time after writing the data of the N-th data packet in the first memory, starting reading a first data of the N-th data packet written in the first memory according to the first read address sequence in the first sequence table. In some implementations, the method may include, at a second point-in-time after writing the data of the N-th data packet in the first memory, starting writing the first data of the (N+1)-th data packet in the first memory according to the second write address sequence. In some implementations, a time interval between the first point-in-time and the second point-in-time may be a period used to read one data of the N-th data packet.

In some implementations, the first memory includes a static random access memory or a register.

According to a further aspect of the present disclosure, a memory system is provided. The memory system may include at least one memory device and a memory controller coupled to the at least one memory device and configured to control the memory device. The memory controller may include a first memory, an address manager, and a processor. The processor is configured to write data of an N-th data packet in the first memory. N may be a positive integer. The address manager is configured to generate a first read address sequence according to a first write address sequence in which the data of the N-th data packet is written in the first memory. The processor is configured to update the first read address sequence into a first sequence table, read the data of the N-th data packet written in the first memory according to the first read address sequence in the first sequence table. The processor is configured to write data of an (N+1)-th data packet in the first memory according to a second write address sequence in a process of reading the data of the N-th data packet. The address manager is further configured to generate a second read address sequence according to the second write address sequence. The processor is further configured to update the second read address sequence into a second sequence table. The processor is further configured to read the data of the (N+1)-th data packet written in the first memory according to the second read address sequence in the second sequence table.

According to still another aspect of the present disclosure, a non-transitory computer-readable medium storing instructions is provided. The instructions, which when executed by a processor, cause the processor to implement a method of operating a memory controller. The method may include writing data of an N-th data packet in a first memory of the memory controller. N may be a positive integer. The method may include generating a first read address sequence according to a first write address sequence in which the data of the N-th data packet is written in the first memory. The method may include updating the first read address sequence into a first sequence table and reading the data of the N-th data packet written in the first memory according to the first read address sequence in the first sequence table. The method may include writing data of an (N+1)-th data packet in the first memory according to a second write address sequence in a process of reading the data of the N-th data packet. The method may include generating a second read address sequence according to the second write address sequence. The method may include updating the second read address sequence into a second sequence table. The method may include reading the data of the (N+1)-th data packet written in the first memory according to the second read address sequence in the second sequence table.

In the example of the present disclosure, when the data of the data packet is being buffered, the first read address sequence is generated according to the first write address sequence in which the data of the N-th data packet is written in the first memory, and in the process of reading the N-th data packet according to the first read address sequence in the first sequence table, the data of the (N+1)-th data packet is written in the first memory according to the second write address sequence, the data of the (N+1)-th data packet is further read according to the second read address sequence in the second sequence table, and the second read address sequence is generated according to the second write address sequence. In the example of the present disclosure, the first/second write address sequence and the first/second read address sequence are optimized, and the first read address sequence is updated into the first sequence table, and the second read address sequence is updated into the second sequence table, the data of the (N+1)-th data packet is written in the first memory according to the second write address sequence in the process of reading the data of the N-th data packet according to the first read address sequence in the first sequence table. The latency of buffering the data of the adjacent data packets is reduced, and the efficiency and continuity of buffering the data are improved without increasing the additional buffer space, which facilitates the improvement of integration level of memory devices and their systems.

DETAILED DESCRIPTION

Figure 1:
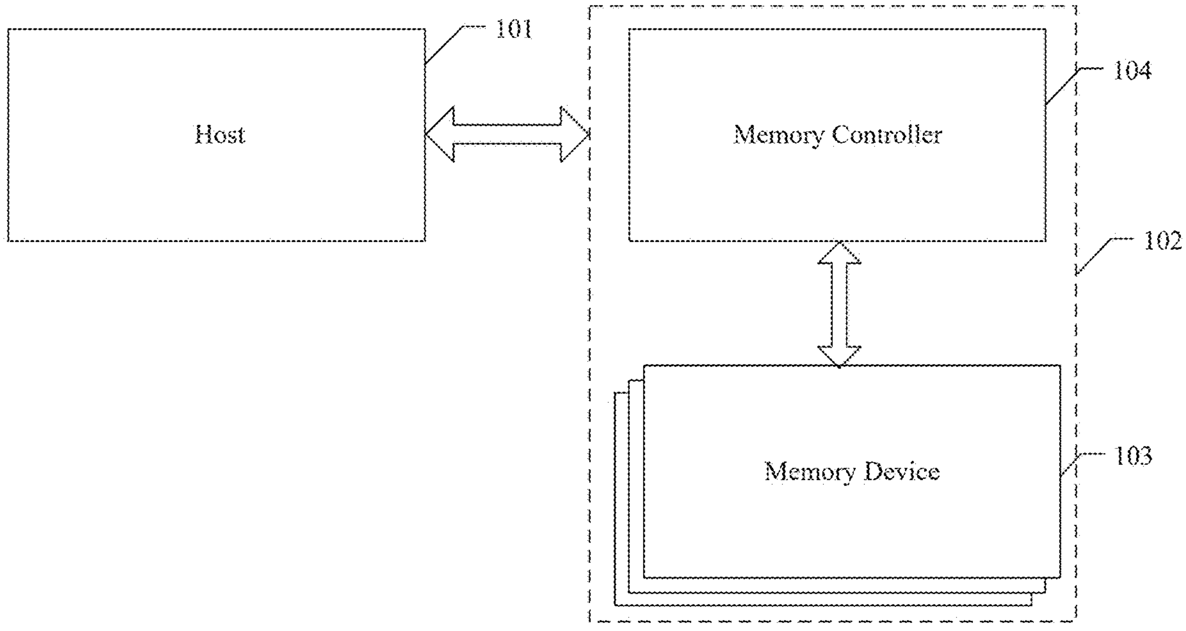
FIG. 1 is a first schematic diagram of an exemplary system with a memory system according to an example of the present disclosure.

Exemplary implementations disclosed in the present disclosure will be described in more detail below with reference to the accompanying drawings. Although exemplary implementations of the present disclosure are shown in the accompanying drawings, it should be understood that the present disclosure may be implemented in various forms and should not be limited to the implementations set forth herein. Rather, these implementations are provided so that the present disclosure can be more thoroughly understood and the scope disclosed in the present disclosure can be fully conveyed to those skilled in the art.

In the following description, numerous details are given in order to provide a more thorough understanding of the present disclosure. However, it will be apparent to one skilled in the art that, the present disclosure may be practiced without one or more of these details. In other examples, in order to avoid ambiguity with the present disclosure, some technical features known in the art are not described; that is, not all features of the actual examples are described here, and well-known functions and structures are not described in detail.

In the drawings, like reference numerals refer to like elements throughout.

It should be understood that spatial relation terms such as "beneath," "below," "lower," "under", "above," "upper," etc., may be used herein for ease of description to describe the relationship between one element or feature and other elements or features shown in the figures. It should be appreciated that, in addition to the orientations shown in the figures, the spatial-relation terms intent to also include different orientations of the devices in use and operation. For example, if the devices in the figures are flipped, then described as "below" or "under" or "beneath" other elements or features will be oriented "on" other elements or features. Thus, the exemplary terms "below" and "under" may include both upper and lower orientations. The devices may be additionally oriented (rotated 90 degrees or other orientations) and the spatial description terminology used herein is interpreted accordingly.

A term used herein is for the purpose of describing a particular example only and is not to be considered as limitation of the present disclosure. As used herein, the singular forms "a", "an" and "said/the" are intended to include the plural forms as well, unless the context clearly dictates otherwise. It should also be understood that the terms "consist of", "include" and/or "comprising", when used in this description, identify the presence of stated features, integers, steps, operations, elements and/or parts, but do not exclude the presence and addition of one or more other features, integers, steps, operations, elements, parts and/or groups. As used herein, the term "and/or" includes any and all combinations of associated listed items.

The memory device in the examples of the present disclosure includes, but is not limited to, a three-dimensional NAND type memory. For ease of understanding, the following takes a three-dimensional NAND type memory as an example to illustrate.

FIG. 1 is a schematic diagram of an exemplary system with a memory system provided by an example of the present disclosure. In an example of the present disclosure, the system 100 may be a mobile phone, a desktop computer, a laptop computer, a tablet computer, a vehicle computer, a game console, a printer, a positioning device, a wearable electronic device, a smart sensor, a virtual reality (VR) device, an augmented reality (AR) device, or any other suitable electronic device having a memory therein. As shown in FIG. 1, the system 100 may include a host 101 and a memory system 102, which may include one or more memory devices 103 and a memory controller 104. The host 101 may include a processor of an electronic device, for example, a central processing unit (CPU), or a system on a chip (SoC), for example, an application processor (AP). The host 101 may be configured to send or receive data to or from the memory system 102.

In some implementations, the memory controller 104 is coupled to the memory device 103 and the host 101 and is configured to control the memory device 103. The memory controller 104 may manage data stored in the memory device 103 and communicate with the host 101. In some examples, the memory controller 104 is designed to operate in a low duty cycle environment, such as in a secure digital (SD) card, compact flash card (CFC), universal serial bus (USB) flash drive, or to operate in other medium for use in electronic devices such as personal computers, digital cameras, mobile phones, and the like. In other implementations, the memory controller 104 is designed to operate in a high duty cycle environment, such as in a solid state disk or embedded Multi-Media Card (eMMC).

In some examples, the memory controller 104 and the one or more memory devices 103 may be integrated into various types of storage devices; that is, the memory system 102 may be implemented and packaged into different types of terminal electronics.

Figure 2:
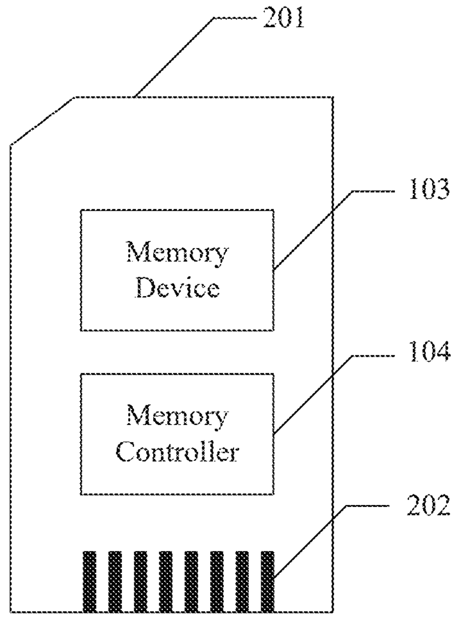
FIG. 2 is a schematic diagram of an exemplary memory card with a memory system according to an example of the present disclosure.
Figure 3:
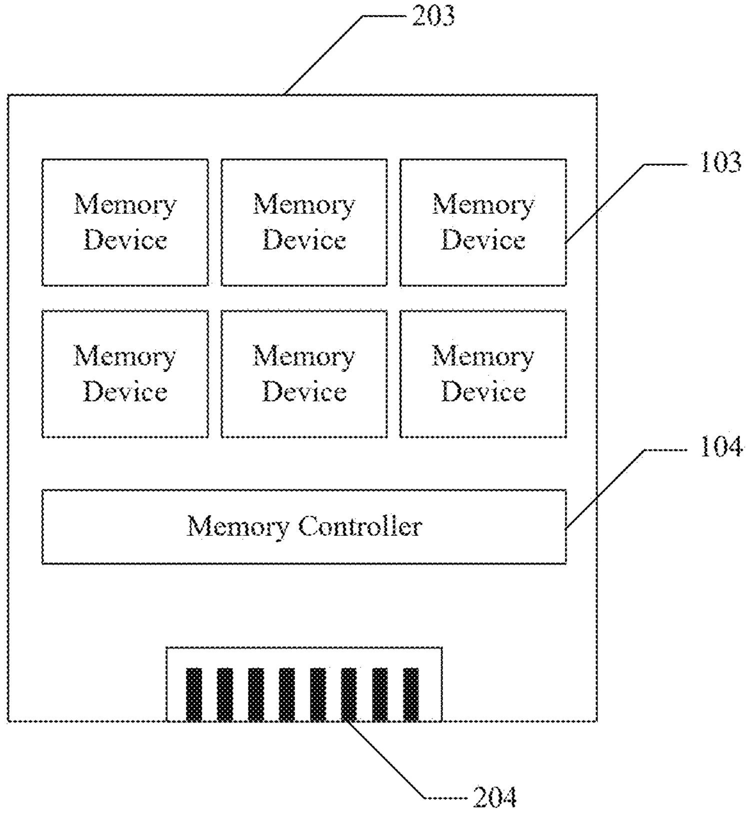
FIG. 3 is a schematic diagram of an exemplary solid state drive with a memory system according to an example of the present disclosure.

In one example as shown in FIG. 2, the memory controller 104 and the single memory device 103 may be integrated into the memory card 201. The memory card 201 may be one of a compact flash memory card, a smart media card (SMC), a memory stick (MS), a multimedia card (MMC) (e.g., a reduced-size MMC (RS-MMC), an MMCmicro, an eMMC, or the like), a secure digital card (e.g., a Mini SD card, a Micro SD card, a SD high capacity (SDHC) card, or the like), and a universal flash memory card. The memory card 201 may also include a memory card connector 202 that couples the memory card 201 with a host-side device (e.g., host 101 in FIG. 1). In another example as shown in FIG. 3, the memory controller 104 and a plurality of memory devices 103 may be integrated into SSD 203. SSD 203 may also include an SSD connector 204 that couples SSD 203 with a host-side device (e.g., host 101 in FIG. 1). In some implementations, the storage capacity and/or operating speed of SSD 203 is greater than the storage capacity and/or operating speed of memory card 201.

Figure 4:
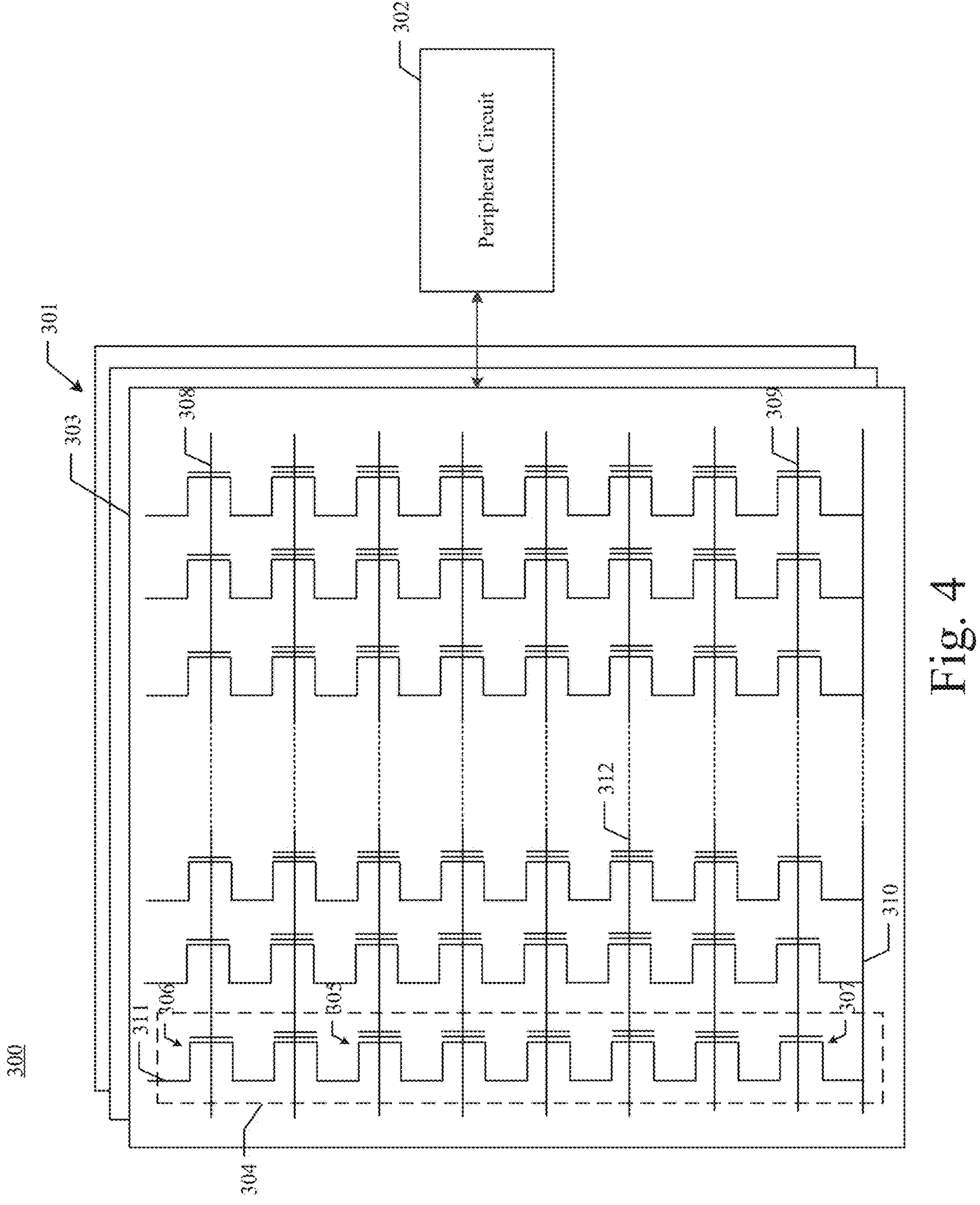
FIG. 4 is a schematic diagram of an exemplary memory device including a peripheral circuit according to an example of the present disclosure.

FIG. 4 is a schematic circuit diagram of an exemplary memory device 300 including a peripheral circuit provided by an example of the present disclosure. The memory device 300 may be an example of the memory device 103 in FIG. 1. The memory device 300 may include a memory array 301 and a peripheral circuit 302 coupled to the memory array 301. Taking the memory array 301 as a 3D NAND type memory array as an example for description, the memory cell 305 is a NAND memory cell, the memory cell 305 is provided in the form of an array of memory cell strings 304, and each memory cell string 304 extends vertically above a substrate (not shown). In some implementations, each memory cell string 304 includes a plurality of memory cells 305 coupled in series and stacked vertically. Each memory cell 305 may maintain a continuous analog value, e.g., voltage or charge, which depends on the number of electrons trapped within a region of memory cell 305. Each memory cell 305 can be either a floating-gate type of memory cell including a floating-gate transistor or a charge trap type of memory cell including a charge-trap transistor.

In some implementations, each memory cell 305 is a single level cell (SLC) having two possible memory states and thus may store one bit of data. For example, the first memory state "0" may correspond to a first voltage range and the second memory state "1" may correspond to a second voltage range. In some implementations, each memory cell 305 is a multi-level cell capable of storing more than a single bit of data in four or more memory states, e.g., a multi-level cell (MLC) storing two bits per cell, a triple level cell (TLC) storing three bits per cell, or a quad-level cell (QLC) storing four bits per cell.

As shown in FIG. 4, each memory cell string 304 may include a bottom select transistor (BST) 307 at its source terminal and a top select transistor (TST) 306 at its drain terminal. The bottom select transistor 307 and the top select transistor 306 may be configured to activate the selected memory cell string 304 during read and program operations. In some implementations, the sources of the memory cell strings 304 in the same memory block 303 may be coupled through a common source line (CSL) 310. In other words, all the memory cell strings 304 in the same memory block 303 have an array common source (ACS). According to some implementations, the top select transistor 306 of each memory cell string 304 is coupled to a respective bit line (BL) 311 from which data can be read or written via an output bus (not shown). In some implementations, each memory cell string 304 is configured to be selected or deselected by applying a select voltage (e.g., a voltage higher than a threshold voltage of the top select transistor 306) or a deselect voltage (e.g., 0V) to a top select gate (TSG) of the respective top select transistor 306 through one or more top select lines (TSL) 308 and/or by applying a select voltage (e.g., a voltage higher than a threshold voltage of the bottom select transistor 307) or a deselect voltage (e.g., 0V) to a bottom select gate (BSG) of the respective bottom select transistor 307 through one or more bottom select lines (BSL) 309.

As shown in FIG. 4, the memory cell string 304 may be organized into a plurality of memory blocks 303, each of which may have a common source line 310. In some implementations, each memory block 303 is a basic data unit for an erase operation, e.g., all memory cells 305 on the same memory block 303 are erased simultaneously. To erase the memory cells 305 in the selected memory block, a common source line 310 coupled to the selected memory block and an unselected memory block in the same side as the selected memory block may be biased with an erase voltage. It should be understood that, in some examples, erase operations may be performed at a half-memory block level, at a quarter-memory block level, or at a level with any suitable number of memory blocks or any suitable fraction of a memory block. Memory cells 305 of adjacent memory cell strings 304 may be coupled by word lines 312 that select which rows of memory cells 305 are affected by read or program operations.

In some examples, the peripheral circuit 302 may include any suitable analog, digital, and mixed signal circuit to enable operation of the memory array 301 by applying voltage signals and/or current signals to and sensing voltage signals and/or current signals from each of target memory cells 305 through the bit lines 311, the word lines 312, the common source lines 310, the bottom select lines 309, and the top select lines 308. The peripheral circuit 302 may include various types of peripheral circuits formed using metal-oxide-semiconductor technology.

Figure 5:
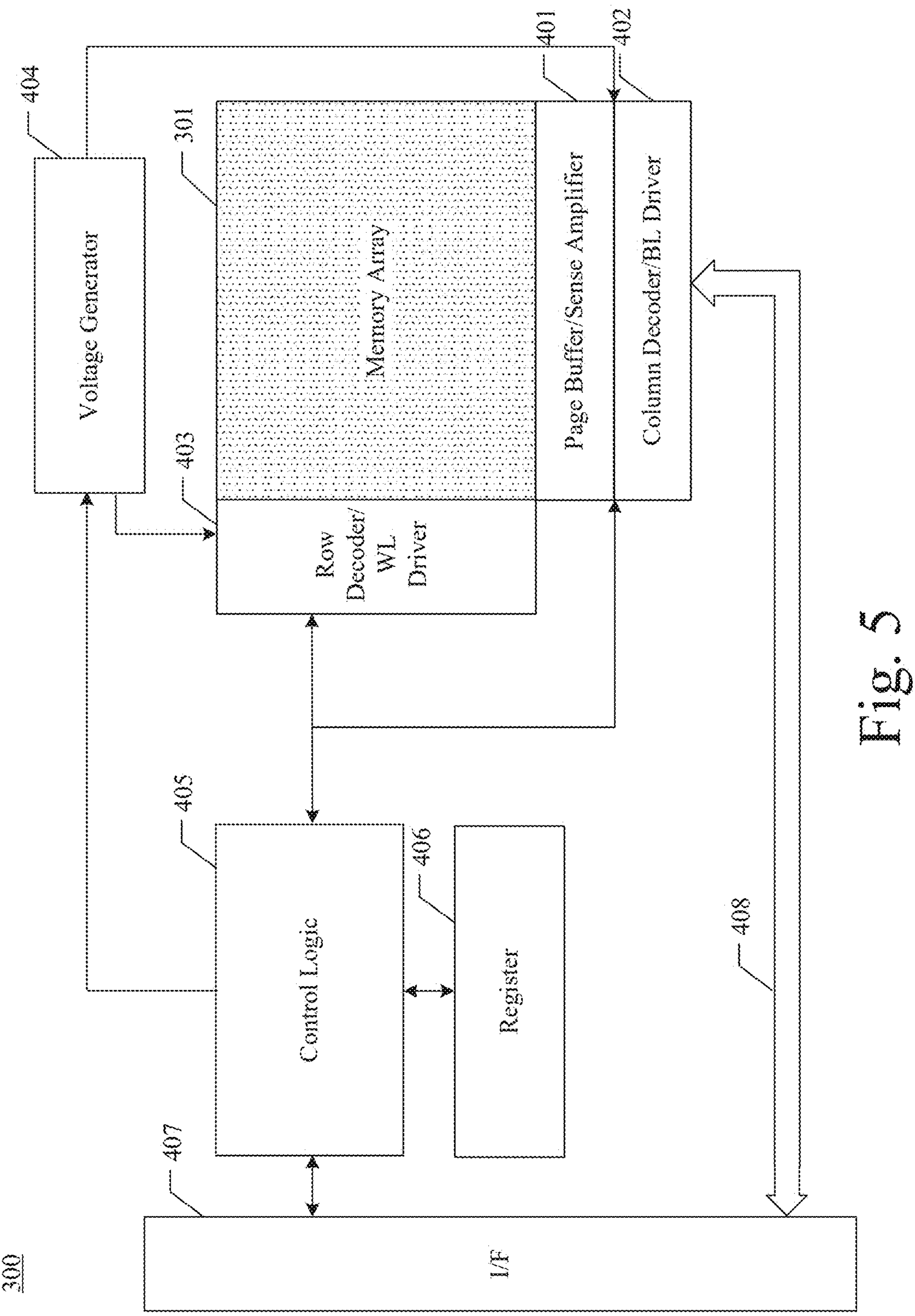
FIG. 5 is a schematic diagram of an exemplary memory including a memory array and a peripheral circuit according to an example of the present disclosure.

FIG. 5 shows some exemplary peripheral circuits 302 including a page buffer/sensing amplifier 401, a column decoder/bit line driver 402, a row decoder/word line driver 403, a voltage generator 404, a control logic 405, a register 406, a flash memory interface 407, and a data bus 408. In some examples, additional peripheral circuits not shown in FIG. 5 may also be included.

The page buffer/sensing amplifier 401 may be configured to read data from and program (write) data to the memory array 301 according to control signals from the control logic 405. In one example, the page buffer/sensing amplifier 401 may store a page of programming data (written data) to be programmed to the memory array 301. In another example, the page buffer/sensing amplifier 401 may perform a programming verification operation to ensure that data has been properly programmed into memory cells coupled to the selected word line. In yet another example, the page buffer/sensing amplifier 401 may also sense a low power signal from the bit line representing a data bit stored in the memory cell, and the page buffer/sensing amplifier 401 may amplify a small voltage swing to an identifiable logic level in a read operation. The column decoder/bit line driver 402 may be configured to be controlled by the control logic 405 and select one or more memory cell strings by applying a bit line voltage generated from the voltage generator 404.

The row decoder/word line driver 403 may be configured to be controlled by the control logic 405 and select/deselect a memory block of the memory array 301 and select/deselect a word line of the memory block. The row decoder/word line driver 403 may also be configured to drive a word line using the word line voltage generated from the voltage generator 404. In some implementations, the row decoder/word line driver 403 may also select/deselect and drive the bottom select line and the top select line. As described in detail below, the row decoder/word line driver 403 is configured to perform a programming operation on memory cells coupled to the selected word line(s). The voltage generator 404 may be configured to be controlled by the control logic 405 and generate word line voltages (e.g., reading voltages, programming voltages, passing voltages, local voltages, verifying voltages, etc.), bit line voltages, and source line voltages to be supplied to the memory array 301.

The control logic 405 may be coupled to each peripheral circuit described above and configured to control operation of each peripheral circuit. Register 406 may be coupled to control logic 405 and include status registers, command registers, and address registers for storing status information, command operation codes (OP codes), and command addresses for controlling operation of each peripheral circuit. The flash memory interface 407 may be coupled to the control logic 405 and act as a control buffer to buffer control commands received from a host-side device (not shown) and relay them to the control logic 405, and buffer status information received from the control logic 405 and relay it to a memory controller. The flash memory interface 407 may also be coupled to the column decoder/bit line driver 402 via the data bus 408, and act as a data I/O interface and a data buffer to buffer and relay data to or from the memory array 301.

Figure 6:
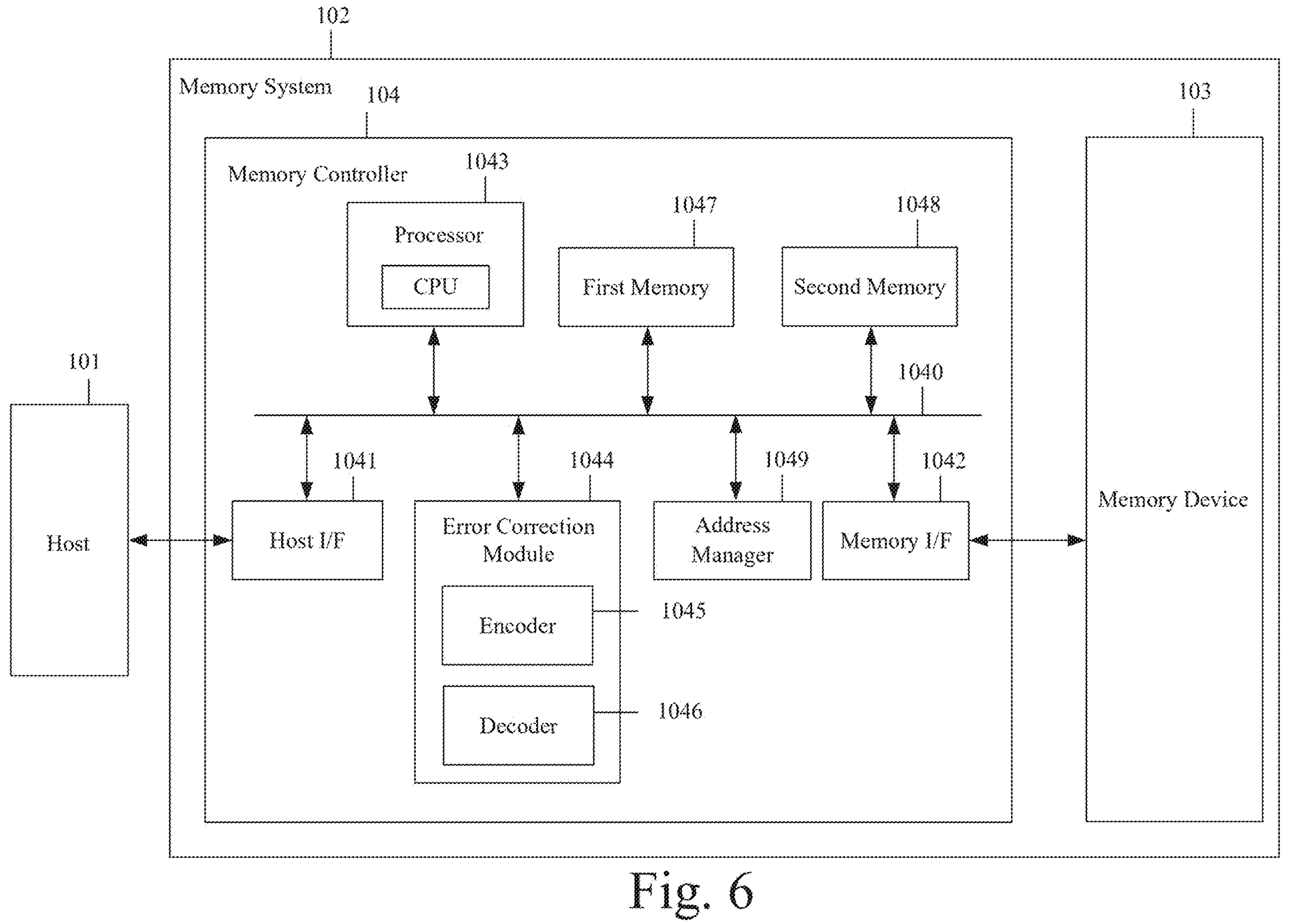
FIG. 6 is a second schematic diagram of an exemplary system with a memory system according to an example of the present disclosure.

FIG. 6 is a schematic diagram of a system including a host and a memory system provided by an example of the present disclosure. As shown in FIG. 6, the memory system 102 is connected to the host 101. The memory system 102 may include a memory controller 104 and a memory device 103. The memory controller 104 is configured to control the memory device 103 to perform operations such as read, write, and erase operations. The memory controller 104 and the memory device 103 may be coupled in any suitable manner.

The memory controller 104 may include a host interface (I/F) 1041, a memory interface (I/F) 1042, a processor 1043, an error correction module 1044, a first memory 1047, and a bus 1040. The host interface 1041 is a connection interface connected between the host 101 and the memory controller 104. The host interface 1041 allows the host 101 and the memory controller 104 to communicate according to a specific protocol, send read and write requests, and perform other operations. The memory interface 1042 is a connection interface between the memory controller 104 and the memory device 103. The memory interface 1042 is configured to implement data transfer between the memory controller 104 and the memory device 103. The processor 1043 is configured to control the memory system 102.

In some examples, the processor 1043 may include one or more units having a logical operation capability, e.g., a central processing unit (CPU) and/or a micro controller unit (MCU).

In some examples, the first memory 1047 is configured to buffer data and functions as a buffer. For example, the data buffered by the first memory 1047 includes, but is not limited to, data received from the host 101, data to be sent to the host 101, data to be written in the memory device 103 (write data), data read from the memory device 103 (read data), and various management data representing a state of the memory device 103 and referenced by the processor 1043 for control of the memory device 103.

In some examples, the error correction module 1044 may be configured to encode and decode data in the memory system using error correction code techniques. Specifically, the error correction module 1044 may include an encoder 1045 and a decoder 1046. The encoder 1045 may be configured to encode the data to be written in the memory device in a write operation. The decoder 1046 may be configured to decode codewords to be decoded in the read data in a read operation.

In some implementations, the first memory 1047 may be a First-In First-Out (FIFO) memory. When the first memory 1047 of the memory controller 104 performs data buffering, the data entering the first memory 1047 first may be output first, and the input sequence of the data is consistent with the output sequence. In this case, the buffer space of the first memory 1047 is equivalent to the size of the to-be-buffered data. In actual application, when a number of data packets that need to be buffered into the first memory 1047 is more than one, data of a next data packet can be written in the first memory 1047 only after all data of a first data packet in the first memory 1047 is read.

In other words, data of a next data packet can be written in the first memory 1047 only after the buffer space of the first memory 1047 is completely released, which makes the data buffered to the first memory inefficient, and the data buffering process is not continuous.

Although by arranging two first memories 1047 and adopting the ping-pong operation, the efficiency of the data buffering and the continuity of buffering the plurality of data packets are improved to a certain extent, the occupied space of the first memories 1047 are also greatly increased, and the space utilization of the memory controller 104 is reduced, which is not conducive to improving the integration level of memory devices and their systems.

Thus, there is an unmet need to improve the efficiency and continuity of data buffering, while at the same time improving space utilization.

To overcome at least one of these and other challenges, the present disclosure provides the following implementations.

An example of the present disclosure provides a memory controller. As shown in FIG. 6, the memory controller 104 includes a first memory 1047, an address manager 1049, and a processor 1043.

The processor 1043 is configured to write data of an N-th data packet in the first memory 1047, where N is a positive integer.

The address manager 1049 is configured to generate a first read address sequence according to a first write address sequence in which the data of the N-th data packet is written in the first memory 1047.

The processor 1043 is configured to: update the first read address sequence into a first sequence table, read the data of the N-th data packet written in the first memory according to the first read address sequence in the first sequence table, and write data of an (N+1)-th data packet in the first memory according to a second write address sequence in a process of reading the data of the N-th data packet.

The address manager 1049 is further configured to generate a second read address sequence according to the second write address sequence.

The processor 1043 is further configured to: update the second read address sequence into a second sequence table, and read the data of the (N+1)-th data packet written in the first memory according to the second read address sequence in the second sequence table.

In the example of the present disclosure, when the data of the data packet is being buffered, the first read address sequence is generated according to the first write address sequence in which the data of the N-th data packet is written in the first memory.

In the process of reading the N-th data packet according to the first read address sequence in the first sequence table, the data of the (N+1)-th data packet is written in the first memory according to the second write address sequence. The data of the (N+1)-th data packet is further read according to the second read address sequence in the second sequence table. The second read address sequence is generated according to the second write address sequence.

In the example of the present disclosure, the first/second write address sequence and the first/second read address sequence are optimized, and the first read address sequence is updated into the first sequence table. The second read address sequence is updated into the second sequence table. The data of the (N+1)-th data packet is written in the first memory according to the second write address sequence in the process of reading the data of the N-th data packet according to the first read address sequence in the first sequence table.

In this way, the latency of buffering the data of the adjacent data packets is reduced, and the efficiency and continuity of buffering the data are improved without increasing the additional buffer space, which facilitates the improvement of integration level of the memory devices and their systems.

In the examples of the present disclosure, the first memory 1047 includes, but is not limited to, a random access memory (RAM), a dynamic random access memory (DRAM), a static random access memory (SRAM), a synchronous dynamic random access memory (SDRAM), a double data rate synchronous dynamic random access memory (DDR SDRAM), or a register.

In some examples, the address ordering of the first write address sequence and the address ordering of the first read address sequence are different, and/or the address ordering of the second write address sequence and the address ordering of the second read address sequence are different.

In the examples of the present disclosure, the first read address sequence is generated according to the first write address sequence, the first read address sequence and the first write address sequence may be same or different. The second read address sequence is generated according to the second write address sequence, and the second read address sequence and the second write address sequence may be same or different.

In some implementations, the address ordering of the first write address sequence and the address ordering of the first read address sequence are different, and the address ordering of the second write address sequence and the address ordering of the second read address sequence are the same.

In some implementations, the address ordering of the second write address sequence and the address ordering of the second read address sequence are different, and the address ordering of the first write address sequence and the address ordering of the first read address sequence are the same.

In some implementations, the address ordering of the first write address sequence and the address ordering of the first read address sequence are different, and the address ordering of the second write address sequence and the address ordering of the second read address sequence are different.

In the case where the address ordering of the write address sequence and the address ordering of the read address sequence of the data of the data packet are different, the first/second write address sequence and the first/second read address sequence are optimized. The first read address sequence is updated into the first sequence table and the second read address sequence is updated into the second sequence table. In this way, when the input sequence of the data is inconsistent with the output sequence of the data, arranging the two first memories and adopting the ping-pong operation are not performed. Instead, the data of the data packet can be written and read by the first sequence table and the second sequence table, thereby improving the space utilization of the memory controller.

In some examples, the processor 1043 is configured to update a plurality of addresses in the first memory 1047 and state values corresponding to the plurality of addresses into an address state table in real time. A state value of a corresponding address in the address state table being a first value represents that the address is in an idle state. A state value of a corresponding address in the address state table being a second value represents that the address is in a non-idle state. The processor 1043 is configured to write the data of the N-th data packet to an idle address in the first memory 1047 for which a state value is the first value according to the address state table. The processor 1043 is configured to write the data of the (N+1)-th data packet to an idle address in the first memory 1047 for which a state value is the first value according to the address state table.

In some implementations, the first value is "0", the second value is "1". The state value corresponding to a certain address in the address state table being "0" represents that no data is stored in the address and the address is in an idle state, which may be used as the target address of the write operation. The state value corresponding to a certain address in the address state table being "1" represents that data is stored in the address and the address is in a non-idle state, which may not be used as the target address of the write operation. The idle address and the non-idle address in the first memory are recorded and updated in real time through the state value in the address state table to allocate the available idle address to the data of the newly written data packet. This improves space utilization of the first memory and data-buffering efficiency.

Figure 7:
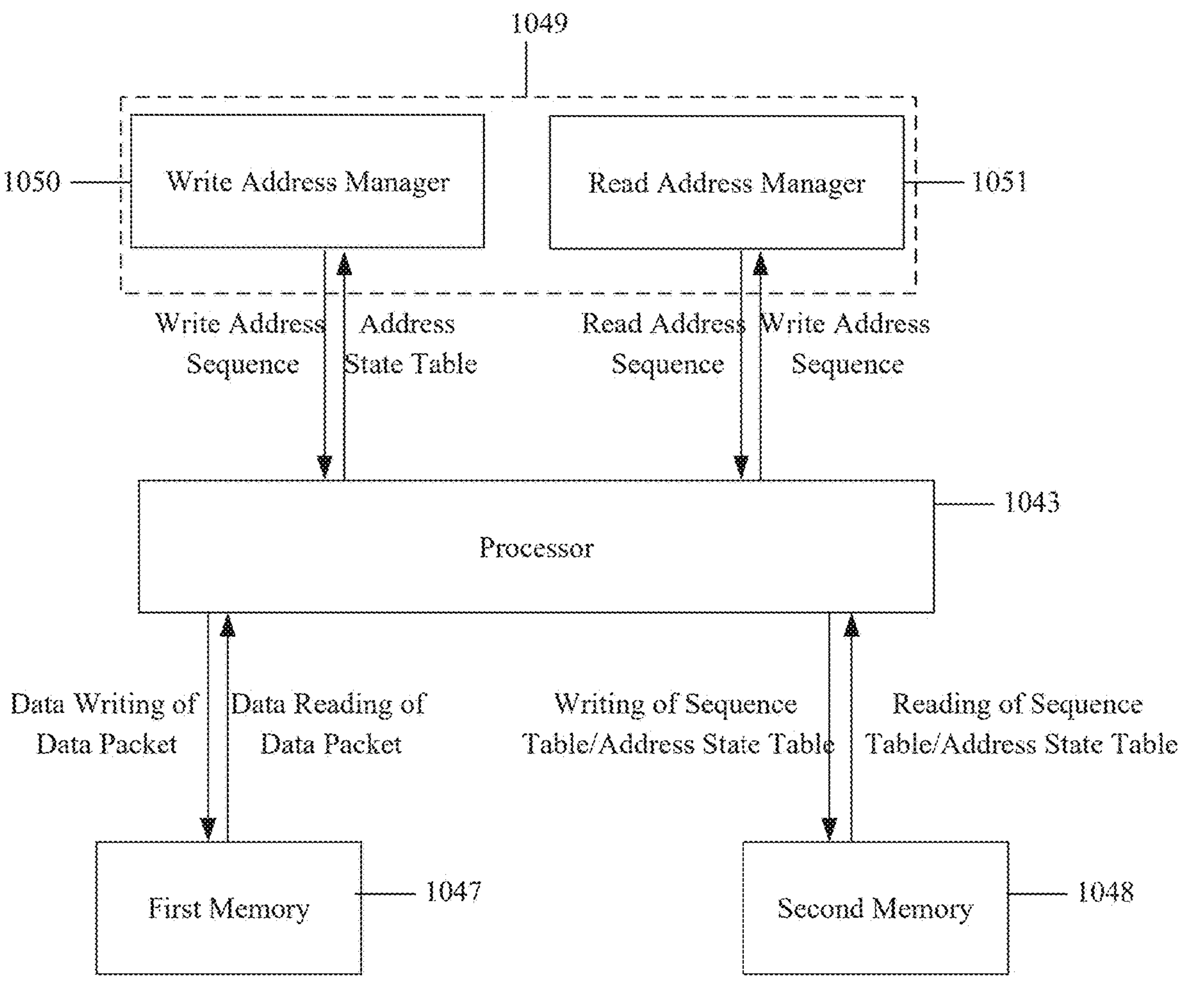
FIG. 7 is a schematic structural diagram of a memory controller provided by an example of the present disclosure.

In some examples, as shown in FIG. 6 and FIG. 7, the memory controller 104 further includes a second memory 1048; and the processor 1043 is configured to store the first sequence table, the second sequence table, and the third sequence table into the second memory 1048.

In some examples, the processor 1043 is further configured to store the address state table into the second memory 1048.

In some examples, the second memory 1048 may be DRAM or SRAM.

In some examples, a capacity of the second memory 1048 is smaller than a capacity of the first memory 1047.

In some implementations, a capacity of the memory is equal to a product of a depth and a bit width of the memory.

In some examples, as shown in FIG. 7, the address manager 1049 includes a write address manager 1050 and a read address manager 1051.

The write address manager 1050 is configured to: generate a first write address sequence according to the address state table, and generate a second write address sequence according to the address state table.

The read address manager 1051 is configured to: generate the first read address sequence according to the first write address sequence, and generate the second read address sequence according to the second write address sequence.

In some implementations, as shown in FIG. 7, the write address manager 1050 is configured to: generate a first write address sequence according to the idle address in the first memory for which a state value is the first value in the address state table, and generate the second write address sequence according to the idle address in the first memory for which a state value is the first value in the address state table.

In some implementations, as shown in FIG. 7, the read address manager 1051 is configured to: generate the read address sequence according to the write address sequence. The write address sequence includes, but is not limited to, a first write address sequence and a second write address sequence. The read address sequence includes, but is not limited to, a first read address sequence and a second read address sequence.

In some implementations, the read address manager 1051 may generate the read address sequence based on the first algorithm according to the write address sequence. For example, the first algorithm includes, but is not limited to, a butterfly operation algorithm and an interleaving algorithm.

In some implementations, as shown in FIG. 7, the processor 1043 sequentially outputs the write address to the read address manager. The processor 1043 receives the read address sequence generated by the read address manager, updates the read address sequence into the sequence table, and stores the sequence table into the second memory 1048. The sequence table herein includes, but is not limited to, a first sequence table and a second sequence table.

In some examples, N is equal to 1. Before the data of the N-th data packet is written in the first memory, the first sequence table and the second sequence table are both in the idle state. While the data of the N-th data packet is being written in the first memory, the first sequence table is in an updated state, and the second sequence table is in the idle state. After the data of the N-th data packet is written in the first memory, the first sequence table is in an output state, and the second sequence table is in the updated state.

In some implementations, before the data of the first data packet is written in the first memory, neither the first sequence table nor the second sequence table stores the read address, and is in an idle state. While the data of the first data packet is being written in the first memory, the processor updates the first read address into the first sequence table, the first sequence table is in the updated state. At this time, the second sequence table still does not store the read address, and is in the idle state.

After the data of the first data packet is written in the first memory, the processor obtains the first read address in the first sequence table and reads the data of the first data packet written in the first memory according to the first read address in the first sequence table, and the first sequence table is in the output state. The processor updates the second read address into the second sequence table, and the second sequence table is in the updated state.

In some examples, the N-th data packet includes X M-bit data. The (N+1)-th data packet includes Y M-bit data. A depth of the first memory is P. A bit width of the first memory is M. X, Y, M, and N are all positive integers. P is greater than the larger one of X and Y.

In some implementations, P being greater than the larger one of X and Y indicates that a capacity of the first memory is greater than a size of an amount of data of any one of the plurality of data packets to be buffered. Therefore, after data of a data packet with larger amount of data in a plurality of data packets to be buffered is written in the first memory, there is still an idle address in the first memory device for data writing of other data packets. The latency of buffering the data of the plurality of data packets can be reduced, and efficiency of data buffering is improved.

In some implementations, X and Y may be equal or unequal. For example, X may be equal to 8, and Y may be equal to 4. As another example, both X and Y are equal to 8.

In some implementations, a difference between P and the larger one of X and Y is 1.

In some implementations, an example in which N is equal to 1, X and Y are both equal to 8, and a difference between P and the larger one of X and Y is 1. For instance, the depth of the first memory 1047 is 9, the first data packet, the second data packet, and the third data packet each includes 8 8-bit data, and the process of buffering the data of the first data packet, the second data packet, and the third data is described in connection with FIG. 8.

Figure 8:
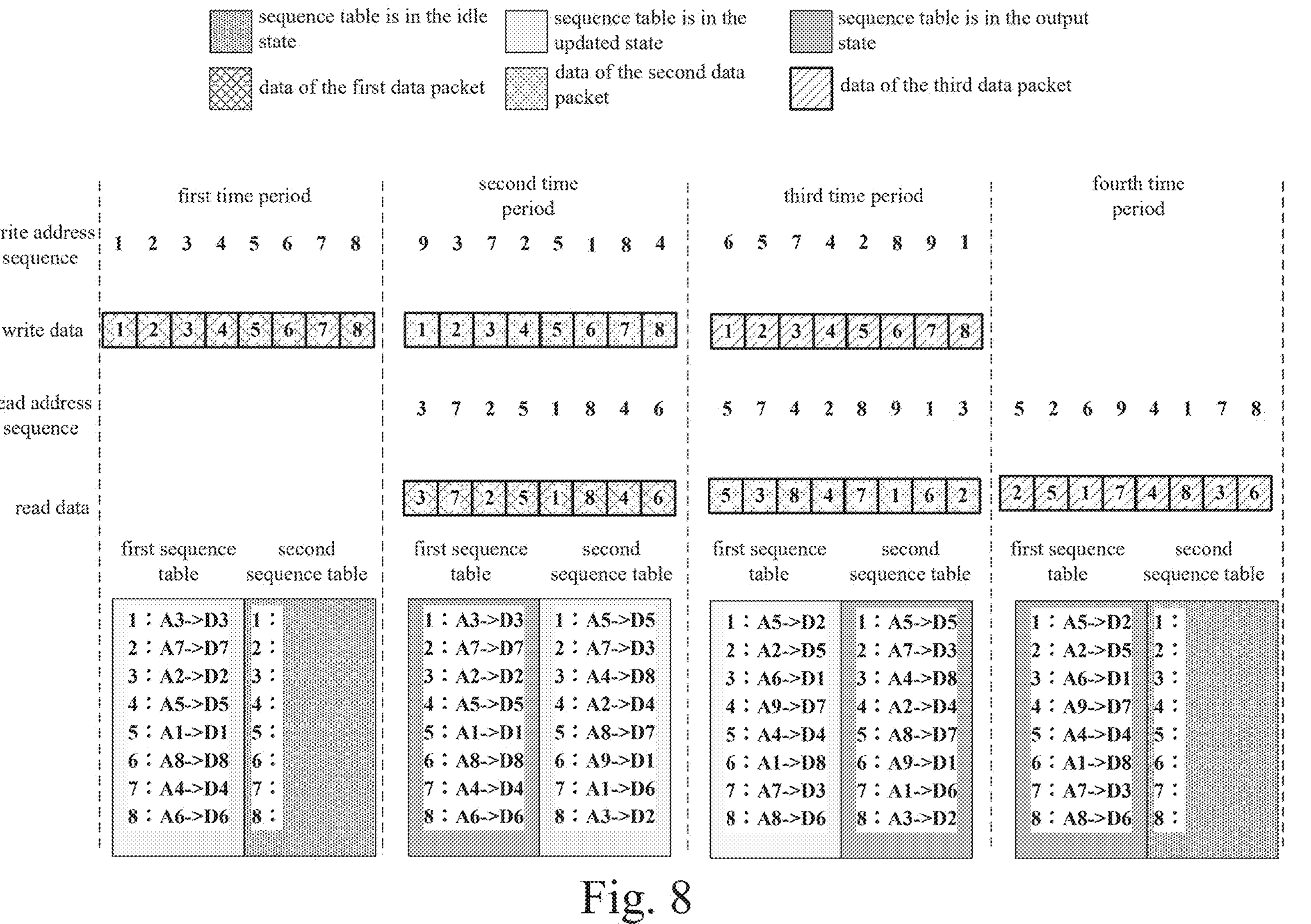
FIG. 8 is a first schematic diagram of a sequence of data writing and reading of a plurality of data packets provided by an example of the present disclosure.

As shown in FIG. 8, in the first time period, the data of the first data packet is written in the first memory 1047. The first read address sequence is generated according to the first write address sequence in which the data of the first data packet is written in the first memory 1047. The first read address sequence is updated into the first sequence table. In the first time period, the first sequence table is in the updated state, and the second sequence table is in the idle state.

For example, the first data packet, the second data packet, and the third data packet each includes 8 8-bit data (e.g., D1, D2, D3, D4, D5, D6, D7, and D8). There are 9 addresses (e.g., the first address A1, the second address A2, the third address A3, the fourth address A4, the fifth address A5, the sixth address A6, the seventh address A7, the eighth address A8, and the ninth address A9) in the first memory.

The 8 8-bit data of the first data packet are sequentially written to the 8 idle addresses of the 9 idle addresses in the first memory. The first read address sequence (37251846) is generated according to the first write address sequence (12345678) in which the data of the first data packet is written in the first memory 1047, and the first read address sequence (37251846) is updated into the first sequence table.

It should be noted that, for brevity, in the write address sequence or the read address sequence, 1 represents the first address A1, 2 represents the second address A2, 3 represents the third address A3, 4 represents the fourth address A4, 5 represents the fifth address A5, 6 represents the sixth address A6, 7 represents the seventh address A7, 8 represents the eighth address A8, and 9 represents the ninth address A9.

For example, the first write address sequence (12345678) represents that the write address sequence is the first address A1, the second address A2, the third address A3, the fourth address A4, the fifth address A5, the sixth address A6, the seventh address A7, and the eighth address A8. The first read address sequence (37251846) represents that the read address sequence is the third address A3, the seventh address A7, the second address A2, the fifth address A5, the first address A1, the eighth address A8, the fourth address A4, and the sixth address A6.

It should be noted that, before the first time period, neither the first sequence table nor the second sequence table stores the read address, and is in an idle state. During the first time period, the first sequence table is in an updated state, and the second sequence table still does not store the read address, and is therefore in an idle state.

During the second time period after the first time period, the data of the first data packet written in the first memory 1047 is read according to the first read address sequence in the first sequence table, and the data of the second data packet is written in the first memory 1047 according to the second write address sequence in the process of reading the data of the first data packet. The second read address sequence is generated according to the second write address sequence. The second read address sequence is updated into the second sequence table. During the second time period, the first sequence table is in an output state, and the second sequence table is in an updated state.

For example, the data of the first data packet written in the first memory 1047 is read according to the first read address sequence (37251846) in the first sequence table, and the data of the second data packet is written in the first memory 1047 according to the second write address sequence in the process of reading the data of the first data packet. The second read address sequence (57428913) is generated according to the second write address sequence (93725184). The second read address sequence (57428913) is updated into the second sequence table.

In some examples, the second write address sequence (93725184) represents that the write address sequence is the ninth address A9, the third address A3, the fourth address A4, the fifth address A5, the sixth address A6, the seventh address A7, the eighth address A8, and the first address A1. The second read address sequence (57428913) represents that the read address sequence is the fifth address A5, the seventh address A7, the fourth address A4, the second address A2, the eighth address A8, the ninth address A9, the first address A1, and the third address A3.

In the example of the present disclosure, since the capacity of the first memory is greater than the size of the data amount of any data packet, after the data of the first data packet is written in the first memory, there is still an idle address in the first memory for writing the data of the second data packet.

In other words, the writing of the data of the (N+1)-th data packet and the reading of the data of the N-th data packet in the example of the present disclosure may start at the same time without waiting, thereby improving data-buffering efficiency.

During the third time period after the second time period, the data of the second data packet written in the first memory 1047 is read according to the second read address sequence in the second sequence table, and the data of the third data packet is written in the first memory 1047 according to the third write address sequence in the process of reading the data of the second data packet. The third read address sequence is generated according to the third write address sequence. The third read address sequence is updated into the first sequence table. During the third time period, the first sequence table is in an updated state, and the second sequence table is in an output state.

For example, the data of the second data packet written in the first memory 1047 is read according to the second read address sequence (57428913) in the second sequence table, and the data of the third data packet is written in the first memory 1047 according to the third write address sequence in the process of reading the data of the second data packet. The third read address sequence (52694178) is generated according to the third write address sequence (65742891). The third read address sequence (52694178) is updated into the first sequence table.

During a fourth time period after the third time period, the data of the third data packet written in the first memory 1047 is read according to the third read address sequence (52694178) in the first sequence table, so that writing and reading of the first data packet, the second data packet, and the third data packet are completed. During the fourth time period, the first sequence table is in an output state, and the second sequence table is in an idle state.

Here, since there is no writing of the data of the next data packet in the fourth time period, the second sequence table does not need to update the read address sequence and is in the idle state.

For example, the data of the third data packet written in the first memory 1047 is read according to the third read address sequence (52694178) in the first sequence table.

In some examples, the data packets of the first data packet, the second data packet, and the third data packet include, but are not limited to, data received from the host 101, data to be sent to the host 101, data to be written in the memory device 103 (write data), data read from the memory device 103 (read data), and various management data representing the state of the memory device 103 and referenced by the processor 1043 for control of the memory device 103.

In some implementations, the data of the first data packet, the second data packet, and the third data packet are data received from the host 101. The data of the first data packet, the second data packet, and the third data packet are written in the first memory 1047. The data of the first data packet, the second data packet, and the third data packet are read in the first memory 1047 and sent to the memory device 103.

In some implementations, the data of the first data packet, the second data packet, and the third data packet are data to be transmitted to the host 101. The data of the first data packet, the second data packet, and the third data packet are written in the first memory 1047. The data of the first data packet, the second data packet, and the third data packet are read in the first memory 1047 and sent to the host 101.

In some implementations, the data of the first data packet, the second data packet, and the third data packet may also be a posterior probability message, and the first memory 1047 may be disposed in the decoder 1046.

For example, the Low Density Parity Check (LDPC) code is a sparse matrix-based parallel iterative decoding algorithm, which has the performance approaching the Shannon limit. LDPC is simple to decode and can perform parallel operation, and has become one of the most widely used error correction codes.

The decoder 1046 shown in FIG. 6 may decode the to-be-decoded codeword in a LDPC layered decoding manner. The data of the first data packet, the second data packet, and the third data packet may be posterior probability information when LDPC layered decoding is performed.

In the examples of the present disclosure, the first sequence table and the second sequence table are alternately in different states (idle state/updated state/output state) in different time periods of the data buffering. The first/second sequence table may store the read address sequence of the data of the corresponding data packet or provide the read address sequence for the data read of the corresponding data packet in different time periods. By generating the read address sequence in advance and updating it into the first/second sequence table, the writing of the data of the (N+1)-th data packet and the reading of the data of the N-th data packet may start at the same time without waiting, thereby improving the efficiency of the data buffering.

In some examples, X is greater than Y. The processor is further configured to, in a process of reading the data of the N-th data packet, start writing data of an (N+2)-th data packet in the first memory according to a third write address sequence. The address manager is further configured to generate a third read address sequence according to the third write address sequence. The processor is further configured to: update the third read address sequence into a third sequence table, and read the data of the (N+2)-th data packet written in the first memory according to the third read address sequence in the third sequence table.

In some examples, an example in which N is equal to 1, X is equal to 8, Y is equal to 4, and a difference between P and the larger one of X and Y is 1. For instance, the depth of the first memory 1047 is 9, the first data packet and the third data packet each includes 8 8-bit data (D1, D2, D3, D4, D5, D6, D7, and D8), and the second data packet includes 4 8-bit data (D1, D2, D3, and D4). Next, a process of buffering the data of the first data packet, the second data packet and the third data is described with reference to FIGS. 9A and 9B.

During the first time period, 8 8-bit data of the first data packet are sequentially written to 8 idle addresses of the 9 idle addresses in the first memory, a first read address sequence (37251846) is generated according to the first write address sequence (12345678) in which the data of the first data packet is written in the first memory 1047, and the first read address sequence (37251846) is updated into the first sequence table. During the first time period, the first sequence table is in an updated state, and the second sequence table and the third sequence table are in an idle state.

During the second time period, the data of the first data packet written in the first memory 1047 is read according to the first read address sequence (37251846) in the first sequence table, and the data of the second data packet is written in the first memory 1047 according to the second write address sequence in the process of reading the data of the first data packet. The second read address sequence (2793) is generated according to the second write address sequence (9372). The second read address sequence (2793) is updated into the second sequence table.

Because X is greater than Y, that is, the number of data of the second data packet is less than the number of data of the first data packet, in the process of reading the data of the first data packet, after the data of the second data packet is written in the first memory 1047, the excess idle address released by reading the data of the first data packet may be used for writing the data of the third data packet.

In some implementations, in the process of reading the data of the first data packet, the data of the third data packet is started to be written in the first memory according to the third write address sequence.

Figure 9A:
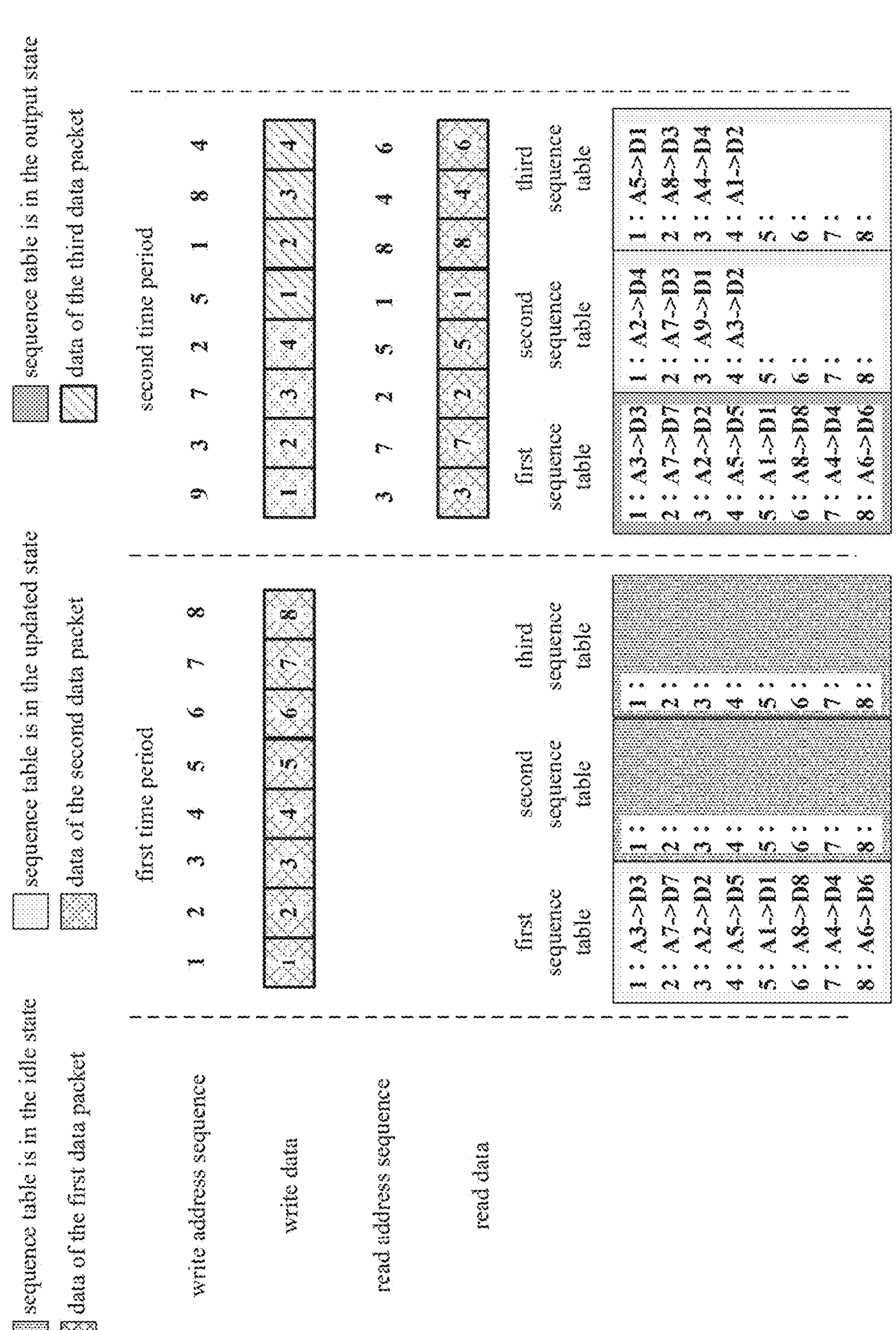
FIGS. 9A and 9B are a second schematic diagram of a sequence of data writing and reading of a plurality of data packets provided by an example of the present disclosure.
Figure 9B:
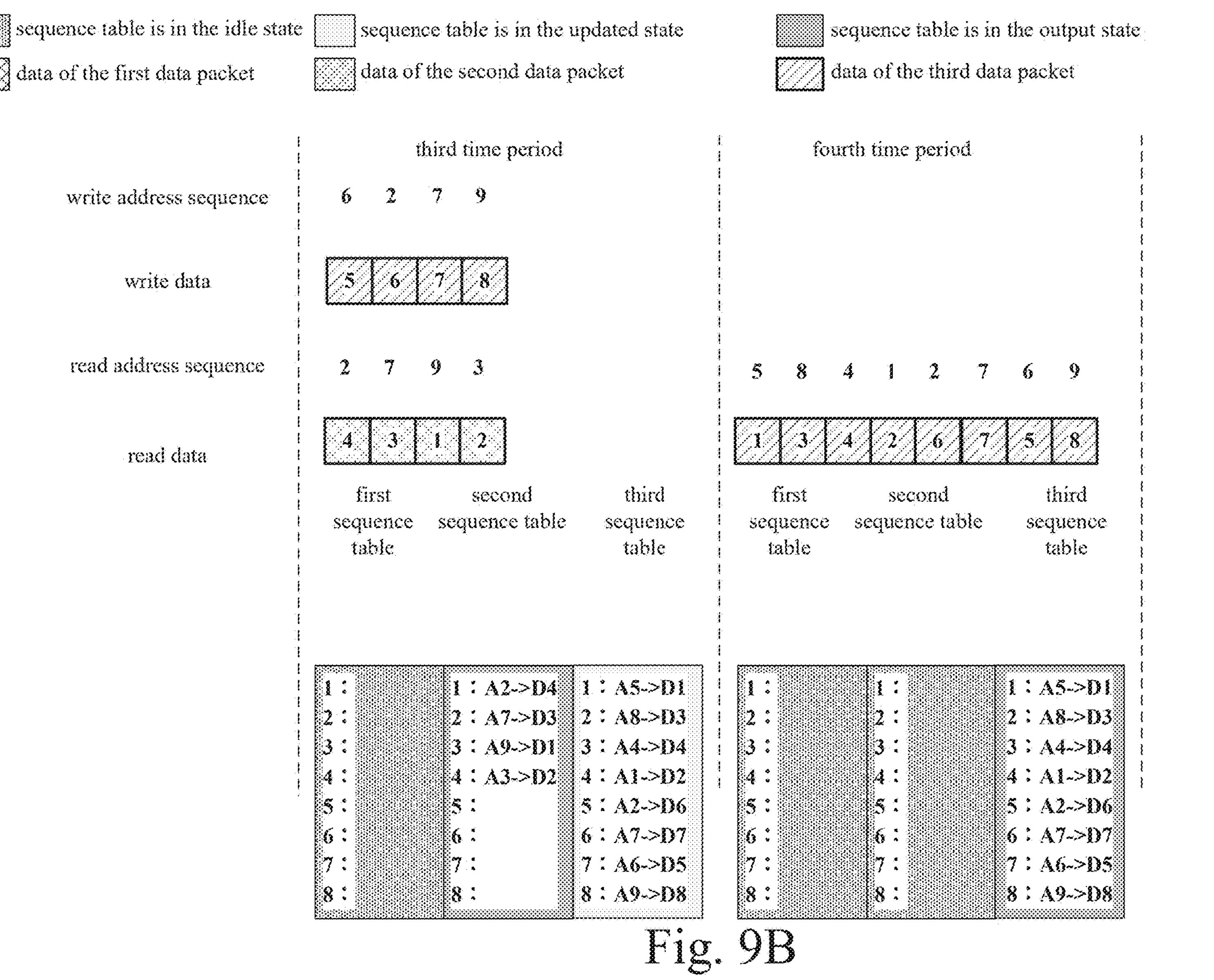

For example, as shown in FIGS. 9A and 9B, during the second time period, four data (D1, D2, D3, and D4) of the third data packet are started to be written in the first memory according to the first part of the third write address sequence; a first part (5841) of the third read address sequence is generated according to the first part (5184) of the third write address sequence; and the first part (5841) of the third read address sequence is updated into the third sequence table. During the second time period, the first sequence table is in an output state, and the second sequence table and the third sequence table are in an updated state.

During the third time period, in the process of reading the data of the second data packet, the other four data (D5, D6, D7, and D8) of the third data packet is continued to be written in the first memory according to the second part of the third write address sequence; the second part (2769) of the third read address sequence is generated according to the second part (6279) of the third write address sequence; and the second part (2769) of the third read address sequence is updated into the third sequence table. During the third time period, the first sequence table is in an idle state, the second sequence table is in an output state, and the third sequence table is in an updated state.

The first part (5841) of the third read address sequence and the second part (2769) of the third read address sequence constitute a third read address sequence (58412769).

It should be noted that since the third data packet includes 8 8-bit data, the writing of the third data packet is started in the process of reading the first data packet (during the second time period), and the writing of the 8 8-bit data of the third data packet is not completed. The writing of the third data packet is completed in the process of reading the first data packet (during the second time period) and in the process of reading the second data packet (during the third time period).

During the fourth time period, the data of the third data packet written in the first memory is read according to the third read address sequence (58412769) in the third sequence table. During the fourth time period, the first sequence table and the second sequence table are in an idle state, and the third sequence table is in an output state.

In the example of the present disclosure, depending on the number of the data packets to be buffered and the size of the data amount of the different data packets, the number of the sequence tables is increased to update the third read address sequence generated when the data of the (N+2)-th data packet is written, so that the idle address in the first memory is efficiently utilized while the efficiency of the data buffering is improved.

In some examples, the depth of the first memory 1047 is 9, the first data packet includes 8 8-bit data (D1, D2, D3, D4, D5, D6, D7, and D8), and the second data packet and the third data packet each includes 4 8-bit data (D1, D2, D3, and D4). Next, a process of buffering the data of the first data packet, the second data packet and the third data is described with reference to FIG. 10.

During the first time period, 8 8-bit data of the first data packet are sequentially written to 8 idle addresses of the 9 idle addresses in the first memory, a first read address sequence (37251846) is generated according to the first write address sequence (12345678) in which the data of the first data packet is written in the first memory 1047, and the first read address sequence (37251846) is updated into the first sequence table. During the first time period, the first sequence table is in an updated state, and the second sequence table and the third sequence table are in an idle state.

During the second time period, the data of the first data packet written in the first memory 1047 is read according to the first read address sequence (37251846) in the first sequence table, and the data of the second data packet is written in the first memory 1047 according to the second write address sequence in the process of reading the data of the first data packet. The second read address sequence (2793) is generated according to the second write address sequence (9372). The second read address sequence (2793) is updated into the second sequence table.

Because X is greater than Y, the number of data of the second data packet is less than the number of data of the first data packet. In the process of reading the data of the first data packet, after the data of the second data packet is written in the first memory 1047, the excess idle address released by reading the data of the first data packet may be used for writing the data of the third data packet.

Figure 10:
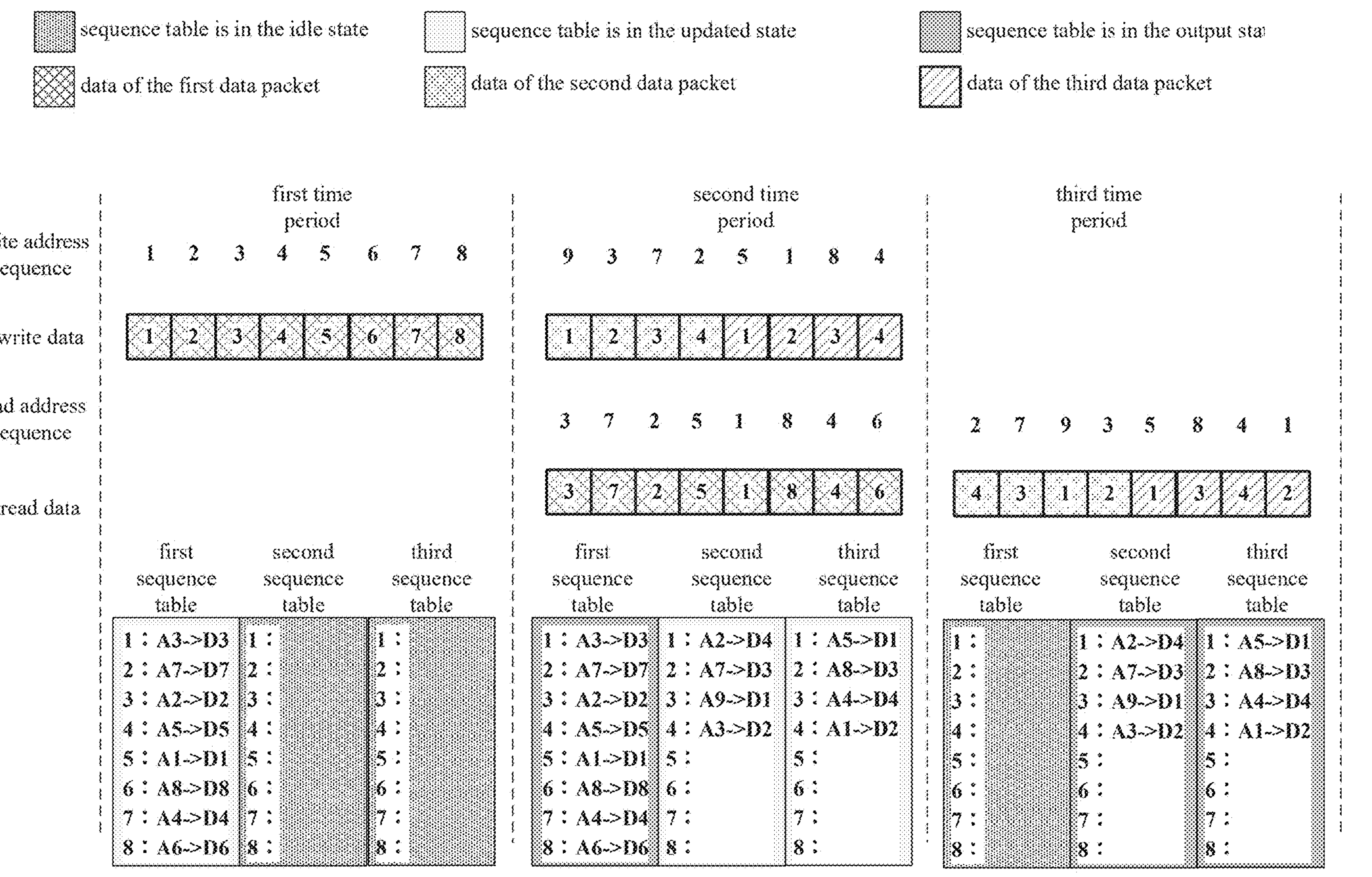
FIG. 10 is a third schematic diagram of a sequence of data writing and reading of a plurality of data packets provided by an example of the present disclosure.

In some implementations, as shown in FIG. 10, during the second time period, the data (D1, D2, D3, and D4) of the third data packet is started to be written in the first memory according to the third write address sequence. The third read address sequence (5841) is generated according to the third write address sequence (5184). The third read address sequence (5841) is updated into the third sequence table. During the second time period, the first sequence table is in an output state, and the second sequence table and the third sequence table are in an updated state.

It should be noted that since the second data packet and the third data packet each includes 4 8-bit data, the data writing of the second data packet and the third data packet are completed in the process of reading the first data packet (during the second time period).

During the third time period, the data of the second data packet written in the first memory is read according to the second read address sequence (2793) in the second sequence table, and the data of the third data packet written in the first memory is read according to the third read address sequence (5841) in the third sequence table. During the third time period, the first sequence table is in an idle state, and the second sequence table and the third sequence table are in an output state.

In some implementations, according to the number of the data packets to be buffered and the size of the data amount of the different data packets, the number of the sequence tables is increased to update the third read address sequence generated when the data of the (N+2)-th data packet is written. In this way, the idle address in the first memory is efficiently utilized, and the efficiency of the data buffering is improved.

In some examples, P is less than twice the larger one of X and Y. In the example of the present disclosure, by setting P to be greater than the larger one of X and Y, in combination with the first sequence table and the second sequence table, the writing of the data of the (N+1)-th data packet and the reading of the data of the N-th data packet may be started at the same time without waiting, thereby improving the efficiency of the data buffering. Here, by setting the upper limit of the depth P of the first memory to be less than twice the larger one of X and Y, the space size occupied by the first memory can be reduced while the efficiency is improved, and the influence on the space utilization of the memory is avoided.

In some examples, P is equal to the larger one of X and Y.

In some examples, the processor is configured to: at a first point-in-time after writing the data of the N-th data packet in the first memory, start reading the first data of the N-th data packet written in the first memory according to the first read address sequence in the first sequence table; and at a second point-in-time after writing the data of the N-th data packet in the first memory, start writing the first data of the (N+1)-th data packet in the first memory according to the second write address sequence. A time interval between the first point-in-time and the second point-in-time is a period used by the processor to read one data of the N-th data packet.

In some examples, an example in which N is equal to 1, X and Y are both equal to 8 and P is equal to 8 is used for illustration. For instance, the depth of the first memory 1047 is 8, and the first data packet, the second data packet, and the third data packet each includes 8 8-bit data (D1, D2, D3, D4, D5, D6, D7, and D8). Next, a process of buffering the data of the first data packet, the second data packet and the third data is described with reference to FIG. 11.

During the first time period, 8 8-bit data of the first data packet are sequentially written to 8 idle addresses of the 9 idle addresses in the first memory, a first read address sequence (37251846) is generated according to the first write address sequence (12345678) in which the data of the first data packet is written in the first memory 1047, and the first read address sequence (37251846) is updated into the first sequence table. During the first time period, the first sequence table is in an updated state, and the second sequence table is in an idle state.

During the second time period, the data of the first data packet written in the first memory 1047 is read according to the first read address sequence (37251846) in the first sequence table, and the data of the second data packet is written in the first memory 1047 according to the second write address sequence in the process of reading the data of the first data packet. The second read address sequence (57428613) is generated according to the second write address sequence (37251846); and the second read address sequence (57428613) is updated into the second sequence table. During the second time period, the first sequence table is in an output state, and the second sequence table is in an updated state.

Figure 11:
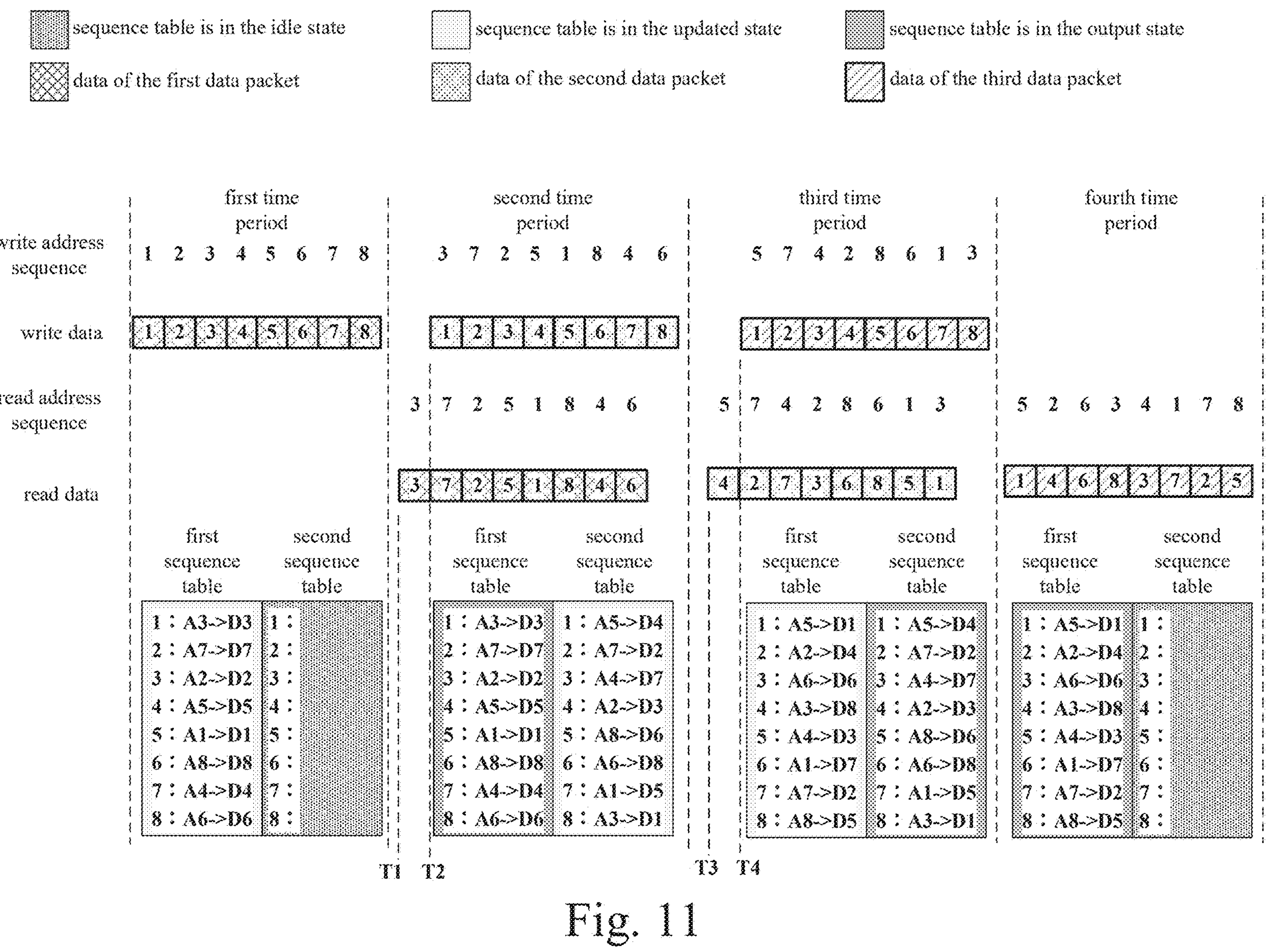
FIG. 11 is a fourth schematic diagram of a sequence of data writing and reading of a plurality of data packets provided by an example of the present disclosure.

In an implementation, as shown in FIG. 11, at a first point-in-time T1 after writing the data of the first data packet in the first memory, the first data of the second data packet written in the first memory is started to be read according to the first read address sequence (37251846) in the first sequence table. At a second point-in-time T2 after writing the data of the first data packet in the first memory, the first data of the second data packet is started to be written in the first memory according to the second write address sequence. The time interval between the first point-in-time T1 and the second point-in-time T2 is a period used by the processor to read one data of the first data packet.

During the third time period, the data of the second data packet written in the first memory 1047 is read according to the second read address sequence (57428613) in the second sequence table, and the data of the third data packet is written in the first memory 1047 according to the third write address sequence in the process of reading the data of the second data packet. The third read address sequence (52634178) is generated according to the third write address sequence (57428613). The third read address sequence (52634178) is updated into the first sequence table. During the third time period, the first sequence table is in an updated state, and the second sequence table is in an output state.

In an implementation, as shown in FIG. 11, at a third point-in-time T3 after writing the data of the second data packet in the first memory, the first data of the second data packet written in the first memory is started to be read according to the second read address sequence (57428613) in the second sequence table. At a fourth point-in-time T4 after writing the data of the second data packet in the first memory, the first data of the third data packet is started to be written in the first memory according to the third write address sequence. The time interval between the third point-in-time T3 and the fourth point-in-time T4 is a period used by the processor to read one data of the second data packet.

During the fourth time period, the data of the third data packet written in the first memory is read according to the third read address sequence (52634178) in the first sequence table. During the fourth time period, the first sequence table is in an output state, and the second sequence table is in an idle state.

It should be noted that the values of N, P, X, Y, and M illustrated in the foregoing examples are merely examples, and are not intended to limit the number of data packets, the depth of the first memory, the size of the data amount of the data packet, and the bit width of the present disclosure.

In addition, duration of different time periods (the first time period, the second time period, the third time period, and the fourth time period) involved in the examples of the present disclosure may be the same or different. In actual application, durations of different time periods are related to a number of data included in different data packets and a depth of the first memory.

For example, a duration of the third time period shown in FIG. 9B is a time used by the processor to read the 4 data of the second data packet. A duration of the fourth time period shown in FIG. 9B is a time used by the processor to read 8 data of the third data packet. In other words, a duration of the third time period shown in FIG. 9B is less than a duration of the fourth time period.

For example, in the third time period shown in FIG. 11, the reading of the 7 data of the 8 data of the second data packet and the writing of the 7 data of the 8 data of the third data packet are performed simultaneously, so the duration of the third time period is the sum of the time used by the processor to write the 8 data of the third data packet and the time used by the processor to read 1 data of the second data packet. The duration of the fourth time period shown in FIG. 11 is the time used by the processor to read the 8 data of the third data packet. Therefore, the duration of the third time period shown in FIG. 11 is greater than the duration of the fourth time period.

According to the example of the present disclosure, the first/second write address sequence and the first/second read address sequence are optimized. The first read address sequence is updated into the first sequence table and the second read address sequence is updated into the second sequence table. Without increasing the occupation space of the first memory, the latency is reduced to the time used by the processor to read one data of the first data packet in the data buffering process of two adjacent data packets, and the efficiency and continuity of data buffering are improved without increasing the additional buffer space. This improves the integration level of memory devices and their systems.

The example of the present disclosure further provides an method of operating the memory controller.

Figure 12:
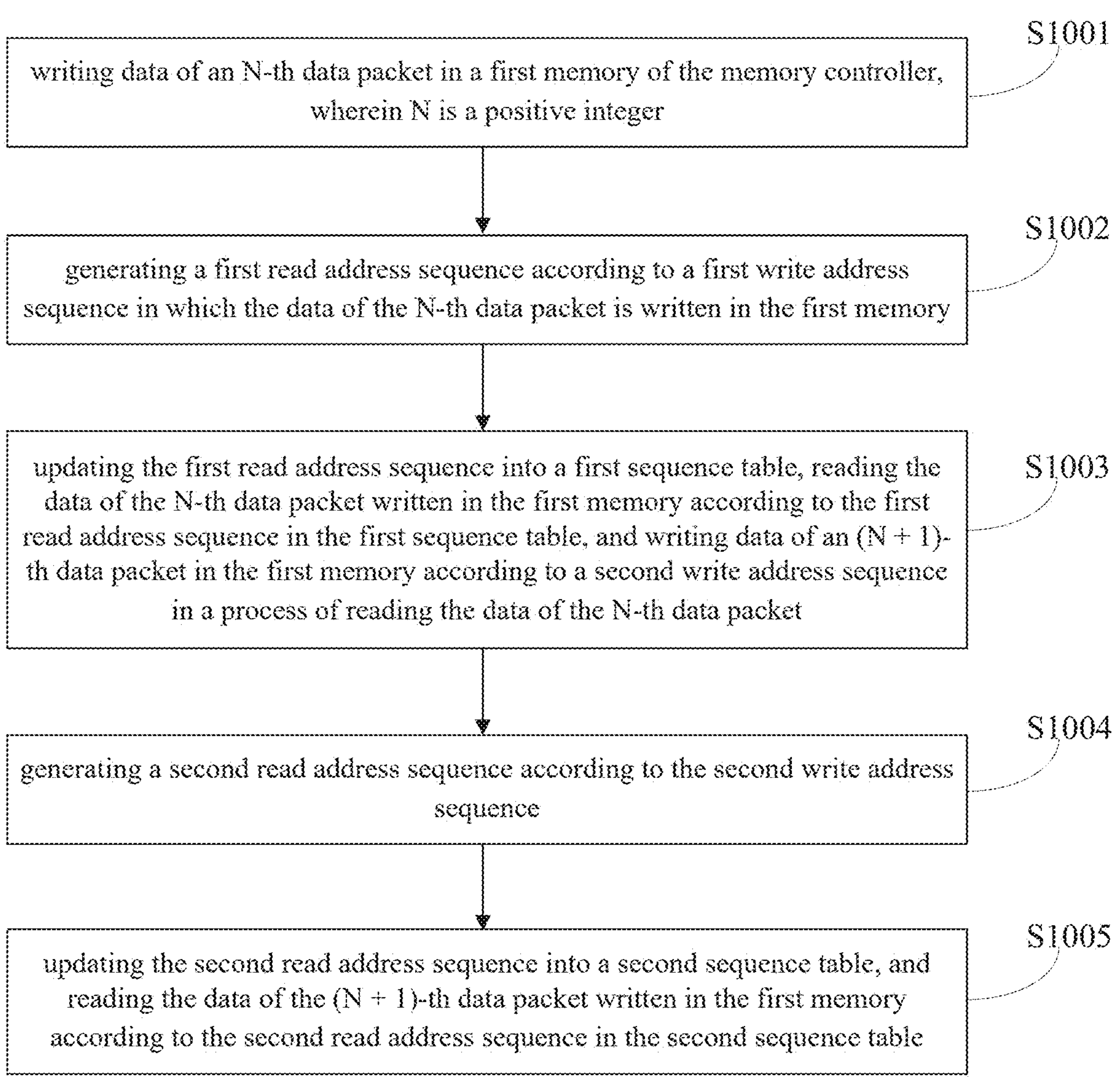
FIG. 12 is a schematic flowchart of a specific implementation of an operating method of a memory controller provided by an example of the present disclosure.

FIG. 12 is the implementation flow diagram of the method of operating the memory controller provided by the example of the present disclosure. As shown in FIG. 12, the operations may include S1001, S1002, S1003, S1004, and S1005.

At operation S1001, data of an N-th data packet is written in a first memory of the memory controller, where N is a positive integer.

At operation S1002, a first read address sequence is generated according to a first write address sequence in which the data of the N-th data packet is written in the first memory.

At operation S1003, the first read address sequence is updated into a first sequence table, the data of the N-th data packet written in the first memory is read according to the first read address sequence in the first sequence table, and data of an (N+1)-th data packet is written in the first memory according to a second write address sequence in a process of reading the data of the N-th data packet.

At operation S1004, a second read address sequence is generated according to the second write address sequence.

At operation S1005, the second read address sequence is updated into a second sequence table, and the data of the (N+1)-th data packet written in the first memory is read according to the second read address sequence in the second sequence table.

In the example of the present disclosure, when the data of the data packet is buffered, the first read address sequence is generated according to the first write address sequence in which the data of the N-th data packet is written in the first memory. In the process of reading the N-th data packet according to the first read address sequence in the first sequence table, the data of the (N+1)-th data packet is written in the first memory according to the second write address sequence, the data of the (N+1)-th data packet is further read according to the second read address sequence in the second sequence table, and the second read address sequence is generated according to the second write address sequence.

In the example of the present disclosure, the first/second write address sequence and the first/second read address sequence are optimized, and the first read address sequence is updated into the first sequence table, and the second read address sequence is updated into the second sequence table. The data of the (N+1)-th data packet is written in the first memory according to the second write address sequence in the process of reading the data of the N-th data packet according to the first read address sequence in the first sequence table. The latency of buffering the data of the adjacent data packets is reduced, and the efficiency and continuity of buffering the data are improved without increasing the additional buffer space, which facilitates the improvement of integration level of memory devices and their systems.

In some examples, an address ordering of the first write address sequence is different from an address ordering of the first read address sequence, and/or an address ordering of the second write address sequence is different from an address ordering of the second read address sequence. In some examples, the method of operating the memory controller further includes: updating a plurality of addresses in the first memory and state values corresponding to the plurality of addresses into an address state table in real time; a state value of a corresponding address in the address state table being a first value represents that the address is in an idle state, and a state value of a corresponding address in the address state table being a second value represents that the address is in a non-idle state; writing the data of the N-th data packet to an idle address in the first memory for which a state value is the first value according to the address state table; and writing the data of the (N+1)-th data packet to an idle address in the first memory for which a state value is the first value according to the address state table.

In some examples, the method of operating the memory controller further includes: generating, by a write address manager of the memory controller, the first write address sequence according to the address state table; generating, by the write address manager of the memory controller, the second write address sequence according to the address state table; and generating, by a read address manager of the memory controller, a first read address sequence according to the first write address sequence; and generating, by the read address manager of the memory controller, the second read address sequence according to the second write address sequence.

In some examples, N is equal to 1; before the data of the N-th data packet is written in the first memory, the first sequence table and the second sequence table are both in the idle state; while the data of the N-th data packet is being written in the first memory, the first sequence table is in an updated state, and the second sequence table is in the idle state; after the data of the N-th data packet is written in the first memory, the first sequence table is in an output state, and the second sequence table is in the updated state.

In some examples, the N-th data packet includes X M-bit data, the (N+1)-th data packet includes Y M-bit data; a depth of the first memory is P; and a bit width of the first memory is M, where X, Y, M, and N are all positive integers, and P is greater than the larger one of X and Y.

In some examples, a difference between P and the larger one of X and Y is 1.

In some examples, X is greater than Y; the method of operating the memory controller further includes: in a process of reading the data of the N-th data packet, starting writing data of an (N+2)-th data packet in the first memory according to a third write address sequence; generating a third read address sequence according to the third write address sequence; updating the third read address sequence into a third sequence table, and reading the data of the (N+2)-th data packet written in the first memory according to the third read address sequence in the third sequence table.

In some examples, the method of operating the memory controller further includes: storing the first sequence table, the second sequence table, and the third sequence table into a second memory of the memory controller.

In some examples, P is less than twice the larger one of X and Y.

In some examples, P is equal to the larger one of X and Y.

In some examples, the method of operating the memory controller further includes: at a first point-in-time after writing the data of the N-th data packet in the first memory, starting reading the first data of the N-th data packet written in the first memory according to the first read address sequence in the first sequence table; and at a second point-in-time after writing the data of the N-th data packet in the first memory, starting writing the first data of the (N+1)-th data packet in the first memory according to the second write address sequence, where a time interval between the first point-in-time and the second point-in-time is a period used to read one data of the N-th data packet.

In some examples, the first memory includes a static random access memory or a register.

The operating method mentioned in the foregoing example has been described in detail in the foregoing examples of the memory controller, and details are not described herein again for brevity.

An example of the present disclosure further provides a memory system, including: at least one memory device; and the memory controller according to any one of the preceding examples, coupled to the at least one memory device and configured to control the memory device.

The memory controller herein may be the memory controller 104 as shown in FIGS. 1, 2, 3, and 6. The processor herein may be understood as the processor 1043 shown in FIG. 6. Further details about the memory controller are described in detail in the foregoing, and details are not described herein again for brevity.

The structure and composition of the memory system may be described in detail with reference to FIGS. 1-6, and details are not described herein again for brevity. The memory device herein may be the memory device 103 as shown in FIGS. 1-6.

An example of the present disclosure further provides a storage medium, where the storage medium stores an executable instruction, and the executable instruction, when executed, implements the operations of the operating method according to any one of the foregoing examples.

In some examples, the storage medium may be a magnetic random access memory (FRAM), a read only memory (ROM), a programmable read-only memory (PROM), an erasable programmable read-only memory (EPROM), an electrically erasable programmable read-only memory (EEPROM), a flash memory, a magnetic surface memory, an optical disk, or a compact disc read-only memory (CD-ROM), or the like; or may be various devices including one or any combination of the foregoing memory devices.

In some examples, the executable instructions may be written in the form of a program, software, software module, script, or code, written in any form of programming language (including compiled or interpreted languages, or declarative or procedural languages), and may be deployed in any form, including being deployed as a standalone program or deployed as a module, component, subroutine, or other unit suitable for use in a computing environment.

As an example, executable instructions may, but not necessarily, correspond to files in a file system, may be stored in a portion of a file that saves other programs or data, for example, stored in one or more scripts in a hypertext markup language (HTML) document, in a single file dedicated to the program in discussion, or in multiple collaborative files (e.g., files that store one or more modules, subroutines, or portions of code).

As an example, executable instructions may be deployed for execution on one electronic device, or on multiple electronic devices located at one location, or on multiple electronic devices distributed at multiple locations and interconnected by a communication network.

Figure 13:
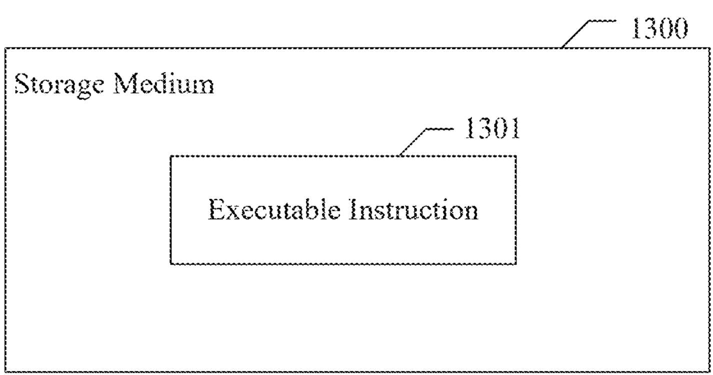
FIG. 13 is a schematic block diagram of a storage medium provided by an example of the present disclosure.

FIG. 13 is a block diagram of a storage medium provided by an example of the present disclosure. An example of the present disclosure provides a storage medium, where the storage medium 1300 stores executable instructions 1301, and the executable instructions 1301, when executed by a processor, implement the method of operating the memory controller in the foregoing technical solutions. The operating method includes: writing data of an N-th data packet in a first memory of the memory controller, where N is a positive integer; generating a first read address sequence according to a first write address sequence in which the data of the N-th data packet is written in the first memory; updating the first read address sequence into a first sequence table; reading the data of the N-th data packet written in the first memory according to the first read address sequence in the first sequence table, and writing data of an (N+1)-th data packet in the first memory according to a second write address sequence in a process of reading the data of the N-th data packet; generating a second read address sequence according to the second write address sequence; updating the second read address sequence into a second sequence table; and reading the data of the (N+1)-th data packet written in the first memory according to the second read address sequence in the second sequence table.

The features disclosed in the several device examples provided by the present disclosure may be arbitrarily combined without conflict, to obtain a new device example.

The methods disclosed in the several method examples provided by the present disclosure may be arbitrarily combined without conflict, to obtain a new method example.

It should be understood that "one example" or "an example" mentioned throughout the specification means that a specific feature, structure, or characteristic related to the example is included in at least one example of the present disclosure. Thus, "in one example" or "in an example" appearing throughout the specification does not necessarily refer to the same example. Further, these particular features, structures, or characteristics may be combined in one or more examples in any suitable manner. It should be understood that, in various examples of the present disclosure, the sequence numbers of the foregoing processes do not mean the order of execution sequences, and the execution sequence of each process should be determined by its function and an intrinsic logic, and should not constitute any limitation on an implementation process of the examples of the present disclosure. The foregoing sequence numbers of the examples of the present disclosure are merely for description, and do not represent the advantages and disadvantages of the examples.

The above descriptions are only specific implementations of the present disclosure, and the protection scope of the present disclosure is not limited thereto, and changes or alternatives that may be easily conceived by any person skilled in the art within the technical scope of the present disclosure should be covered within the protection scope of the present disclosure.

What is claimed is:

1. A memory controller, comprising:

a first memory;

an address manager; and a processor, wherein the processor is configured to: write data of an N-th data packet in the first memory, wherein N is a positive integer;

the address manager is configured to: generate a first read address sequence according to a first write address sequence in which the data of the N-th data packet is written in the first memory;

the processor is configured to: update the first read address sequence into a first sequence table, read the data of the N-th data packet written in the first memory according to the first read address sequence in the first sequence table, and write data of an (N+1)-th data packet in the first memory according to a second write address sequence in a process of reading the data of the N-th data packet;

the address manager is further configured to: generate a second read address sequence according to the second write address sequence; and the processor is further configured to: update the second read address sequence into a second sequence table, and read the data of the (N+1)-th data packet written in the first memory according to the second read address sequence in the second sequence table.

2. The memory controller of claim 1, wherein an address ordering of the first write address sequence is different from an address ordering of the first read address sequence, or an address ordering of the second write address sequence is different from an address ordering of the second read address sequence.

3. The memory controller of claim 1, wherein the processor is configured to:

update a plurality of addresses in the first memory and state values corresponding to the plurality of addresses into an address state table in real time, wherein a state value of a corresponding address in the address state table being a first value represents that the address is in an idle state, and a state value of a corresponding address in the address state table being a second value represents that the address is in a non-idle state;

write the data of the N-th data packet to an idle address in the first memory for which a state value is the first value according to the address state table; and write the data of the (N+1)-th data packet to an idle address in the first memory for which a state value is the first value according to the address state table.

4. The memory controller of claim 3, wherein the address manager comprises a write address manager and a read address manager;

the write address manager is configured to: generate the first write address sequence according to the address state table and generate the second write address sequence according to the address state table; and the read address manager is configured to: generate the first read address sequence according to the first write address sequence and generate the second read address sequence according to the second write address sequence.

5. The memory controller of claim 1, wherein

N is equal to 1;

before the data of the N-th data packet is written in the first memory, the first sequence table and the second sequence table are both in an idle state;

while the data of the N-th data packet is being written in the first memory, the first sequence table is in an updated state, and the second sequence table is in the idle state; and after the data of the N-th data packet is written in the first memory, the first sequence table is in an output state, and the second sequence table is in the updated state.

6. The memory controller of claim 1, wherein the N-th data packet comprises X M-bit data;

the (N+1)-th data packet comprises Y M-bit data;

a depth of the first memory is P; and a bit width of the first memory is M, wherein X, Y, M, and N are all positive integers, and P is greater than a larger one of X and Y.

7. The memory controller of claim 6, wherein a difference between P and the larger one of X and Y is 1.

8. The memory controller of claim 7, wherein

X is greater than Y;

the processor is further configured to: in a process of reading the data of the N-th data packet, start writing data of an (N+2)-th data packet in the first memory according to a third write address sequence;

the address manager is further configured to: generate a third read address sequence according to the third write address sequence; and the processor is further configured to: update the third read address sequence into a third sequence table, and read the data of the (N+2)-th data packet written in the first memory according to the third read address sequence in the third sequence table.

9. The memory controller of claim 8, wherein the memory controller further comprises: a second memory; and the processor is configured to: store the first sequence table, the second sequence table, and the third sequence table into the second memory.

10. The memory controller of claim 6, wherein P is less than twice the larger one of X and Y.

11. The memory controller of claim 6, wherein P is equal to the larger one of X and Y.

12. The memory controller of claim 11, wherein the processor is configured to:

at a first point-in-time after writing the data of the N-th data packet in the first memory, start reading a first data of the N-th data packet written in the first memory according to the first read address sequence in the first sequence table; and at a second point-in-time after writing the data of the N-th data packet into the first memory, start writing the first data of the (N+1)-th data packet in the first memory according to the second write address sequence, wherein a time interval between the first point-in-time and the second point-in-time is a period used by the processor to read one data of the N-th data packet.

13. The memory controller of claim 1, wherein the first memory comprises a static random access memory or a register.

14. A method of operating a memory controller, comprising:

writing data of an N-th data packet in a first memory of the memory controller, wherein N is a positive integer;

generating a first read address sequence according to a first write address sequence in which the data of the N-th data packet is written in the first memory;

updating the first read address sequence into a first sequence table and reading the data of the N-th data packet written in the first memory according to the first read address sequence in the first sequence table, and writing data of an (N+1)-th data packet in the first memory according to a second write address sequence in a process of reading the data of the N-th data packet;

generating a second read address sequence according to the second write address sequence; and updating the second read address sequence into a second sequence table, and reading the data of the (N+1)-th data packet written in the first memory according to the second read address sequence in the second sequence table.

15. The method of claim 14, wherein an address ordering of the first write address sequence is different from an address ordering of the first read address sequence, or an address ordering of the second write address sequence is different from an address ordering of the second read address sequence.

16. The method of claim 14, further comprising:

updating a plurality of addresses in the first memory and state values corresponding to the plurality of addresses into an address state table in real time, wherein a state value of a corresponding address in the address state table being a first value represents that the address is in an idle state, and a state value of a corresponding address in the address state table being a second value represents that the address is in a non-idle state;

writing the data of the N-th data packet to an idle address in the first memory for which a state value is the first value according to the address state table; and writing the data of the (N+1)-th data packet to an idle address in the first memory for which a state value is the first value according to the address state table.

17. The method of claim 16, further comprising:

generating, by a write address manager of the memory controller, the first write address sequence according to the address state table and generating, by the write address manager of the memory controller, the second write address sequence according to the address state table; and generating, by a read address manager of the memory controller, a first read address sequence according to the first write address sequence and generating, by the read address manager of the memory controller, the second read address sequence according to the second write address sequence.

18. The method of claim 14, wherein

N is equal to 1;

before the data of the N-th data packet is written in the first memory, the first sequence table and the second sequence table are both in an idle state;

while the data of the N-th data packet is being written in the first memory, the first sequence table is in an updated state, and the second sequence table is in the idle state; and after the data of the N-th data packet is written in the first memory, the first sequence table is in an output state, and the second sequence table is in the updated state.

19. The method of claim 14, wherein the N-th data packet comprises X M-bit data;

the (N+1)-th data packet comprises Y M-bit data;

a depth of the first memory is P; and a bit width of the first memory is M, wherein X, Y, M, and N are all positive integers, and P is greater than a larger one of X and Y.

20. A memory system, comprising:

at least one memory device; and a memory controller coupled to the at least one memory device and configured to control the memory device, comprising:

a first memory;

an address manager; and a processor, wherein the processor is configured to: write data of an N-th data packet in the first memory, wherein N is a positive integer;

the address manager is configured to: generate a first read address sequence according to a first write address sequence in which the data of the N-th data packet is written in the first memory;

the processor is configured to: update the first read address sequence into a first sequence table, read the data of the N-th data packet written in the first memory according to the first read address sequence in the first sequence table, and write data of an (N+1)-th data packet in the first memory according to a second write address sequence in a process of reading the data of the N-th data packet;

the address manager is further configured to: generate a second read address sequence according to the second write address sequence; and the processor is further configured to: update the second read address sequence into a second sequence table, and read the data of the (N+1)-th data packet written in the first memory according to the second read address sequence in the second sequence table.

* * * * *